(12) United States Patent
Mano

(10) Patent No.: US 11,087,189 B2
(45) Date of Patent: Aug. 10, 2021

(54) POWER SUPPLY APPARATUS, IMAGE FORMING APPARATUS, AND VOLTAGE CONTROL METHOD

(71) Applicant: Tsuyoshi Mano, Tokyo (JP)

(72) Inventor: Tsuyoshi Mano, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/747,966

(22) Filed: Jan. 21, 2020

(65) Prior Publication Data

US 2020/0242434 A1    Jul. 30, 2020

(30) Foreign Application Priority Data

Jan. 28, 2019   (JP) .............................. JP2019-012593

(51) Int. Cl.
*G06K 15/00*  (2006.01)
*H02M 7/217*  (2006.01)
*H02M 5/293*  (2006.01)

(52) U.S. Cl.
CPC ........ *G06K 15/4055* (2013.01); *H02M 5/293* (2013.01); *H02M 7/217* (2013.01)

(58) Field of Classification Search
CPC ... G06K 15/4055; H02M 5/293; H02M 7/217
USPC ................................. 358/1.14, 1.15, 1.9, 504
See application file for complete search history.

(56) References Cited

U.S. PATENT DOCUMENTS

| 4,208,544 A * | 6/1980 | Burke, Jr. .................. H04L 7/10 |
| | | 178/69 G |
| 8,909,079 B2 | 12/2014 | Aoki et al. |
| 2007/0236152 A1* | 10/2007 | Davis .................... H02M 5/293 |
| | | 315/209 R |
| 2012/0045237 A1* | 2/2012 | Aoki .................. G03G 15/1675 |
| | | 399/66 |
| 2015/0055161 A1* | 2/2015 | Allison ................. G06F 21/335 |
| | | 358/1.13 |
| 2019/0369536 A1 | 12/2019 | Mano | |

FOREIGN PATENT DOCUMENTS

| JP | H06-003932 | 1/1994 |
| JP | 2001-218462 | 8/2001 |
| JP | 2012-042835 | 3/2012 |

* cited by examiner

*Primary Examiner* — Quang N Vo

(74) *Attorney, Agent, or Firm* — IPUSA, PLLC

(57) ABSTRACT

A power supply apparatus includes a clock signal generating unit that generates a clock signal with a clock frequency, a calculating unit that calculates a frequency at which a first frequency, a second frequency, and a third frequency are synchronized based on the clock frequency, an AC voltage output unit that outputs an AC voltage of the second frequency based on a signal of the first frequency, a DC voltage output unit outputting a DC voltage based on a signal of the third frequency, and an output unit that outputs based on the AC voltage and the DC voltage.

15 Claims, 27 Drawing Sheets

POWER SUPPLY APPARATUS, IMAGE FORMING APPARATUS, AND VOLTAGE CONTROL METHOD

CROSS-REFERENCE TO RELATED APPLICATIONS

This application is based on and claims priority to Japanese Patent Application No. 2019-012593, filed on Jan. 28, 2019, the entire contents of which are incorporated herein by reference.

BACKGROUND OF THE INVENTION

1. Field of the Invention

The present invention relates to a power supply apparatus, an image forming apparatus, and a voltage control method.

2. Description of the Related Art

In a power supply apparatus of an image forming apparatus, there is a measure of preventing blurring or irregularity of the image by appropriately controlling the output of a high voltage.

Specifically, in the high-voltage power supply control, the AC voltage frequency and the drive frequency of the oscillation circuit are controlled to be integral multiples. In this way, there is known a method of preventing banding based on frequency interference and preventing irregularities in the image (see, for example, Japanese Laid-Open Patent Application H6-3932).

However, because the frequencies used to generate the output power are not synchronized in the above measure, frequency interference may occur in the output power. Therefore, if such a power supply apparatus is used for, for example, an image forming device, abnormalities may occur in images.

SUMMARY OF THE INVENTION

A power supply apparatus includes a clock signal generating unit that generates a clock signal with a clock frequency, a calculating unit that calculates a frequency at which a first frequency, a second frequency, and a third frequency are synchronized based on the clock frequency, an AC voltage output unit that outputs an AC voltage of the second frequency based on a signal of the first frequency, a DC voltage output unit outputting a DC voltage based on a signal of the third frequency, and an output unit that outputs based on the AC voltage and the DC voltage.

DESCRIPTION OF THE EMBODIMENTS

Hereinafter, an optimum form for carrying out the invention will be described with reference to the drawings.

Figure 1:
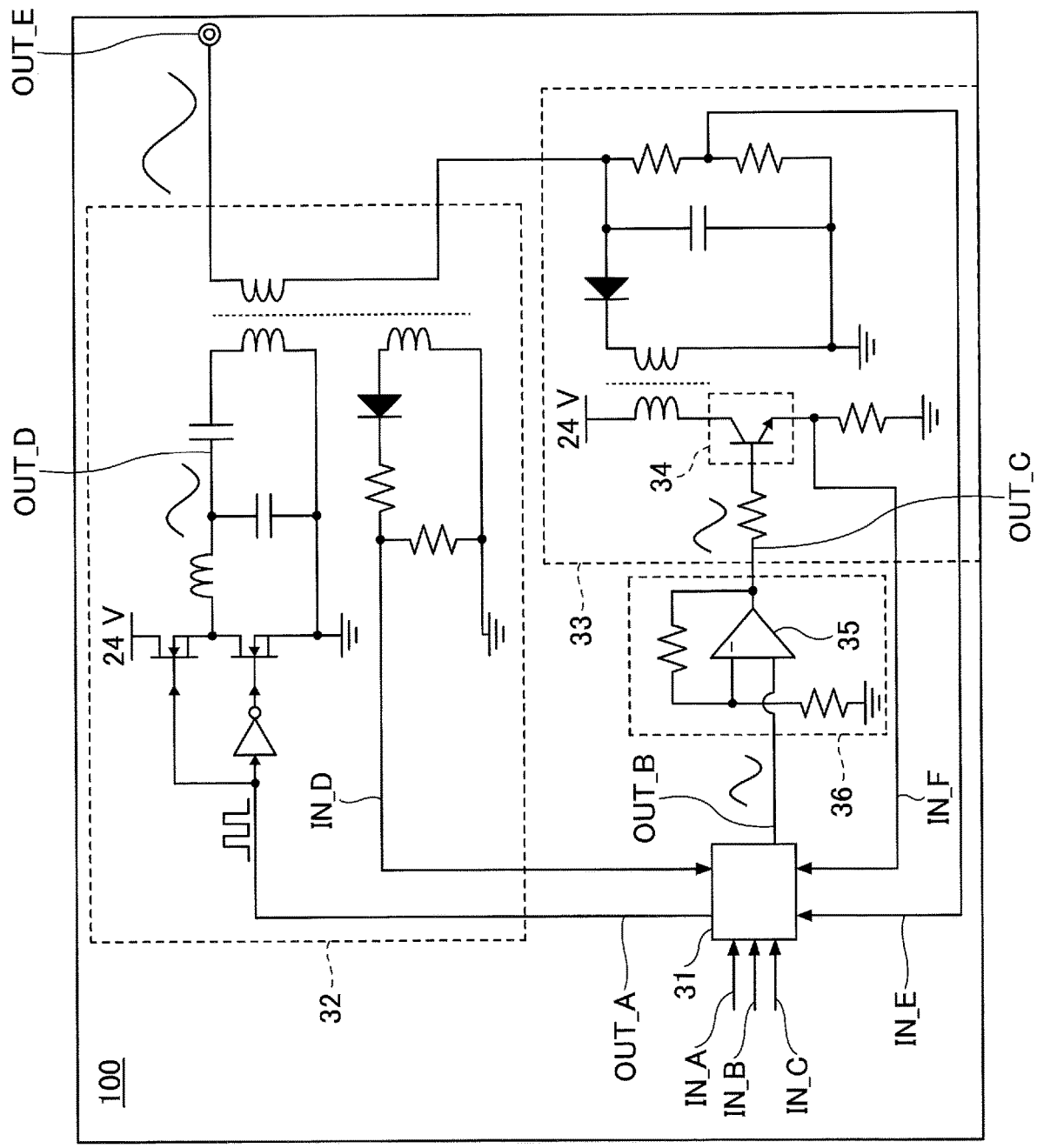
FIG. 1 is a circuit diagram illustrating an overall configuration example of a power supply apparatus.

FIG. 1 is a circuit diagram illustrating an example of an overall configuration of a power supply apparatus.

For example, the power supply apparatus 100 includes a CPU (Central Processing Unit) (hereinafter referred to as "CPU 31"), a high-voltage AC (Alternating Current) generation circuit (hereinafter referred to as "high-voltage AC generation circuit 32"), a high-voltage DC (Direct Current) generation circuit (hereinafter referred to as "high-voltage DC generation circuit 33"), and an operational amplifier circuit 36.

The high-voltage AC generation circuit 32 is an example of an AC voltage output unit. The high-voltage DC generation circuit 33 is an example of a DC voltage output unit.

The CPU 31 is an example of a control device and a control device. The CPU 31 controls the high-voltage AC generation circuit 32, the high-voltage DC generation circuit 33, and the like. First, a frequency command IN_A, an AC voltage command IN_B, and a DC voltage command IN_C are input to the CPU 31 from external sources. The control is performed based on values indicated by these commands.

The CPU 31 outputs a square wave drive signal OUT_A to the high-voltage AC generation circuit 32. For example, the CPU 31 generates the rectangular wave driving signal OUT_A by means of a PWM (Pulse Width Modulation) control (including a duty control or the like). The square wave drive signal OUT_A, as illustrated, is a waveform called a so-called clock signal.

The CPU 31 outputs a sinusoidal wave drive signal OUT_B to the high-voltage DC generation circuit 33 through the operational amplifier circuit 36. For example, the CPU 31 generates a sinusoidal wave, a so-called sinusoidal wave, and outputs it to the operational amplifier circuit 36 for amplifying the signal by the operational amplifier circuit 36. Thus input sinusoidal wave is amplified and the operational amplifier circuit 36 outputs the amplifier signal OUT C.

The CPU 31 performs a peak control for the sinusoidal wave and a voltage control such as soft switching in order to generate the sinusoidal wave drive signal OUT_B.

The details of the CPU 31 will be described later.

The high-voltage AC generation circuit 32 is, for example, a half bridge circuit as illustrated. Accordingly, the high-voltage AC generation circuit 32 is a circuit configuration in which low voltage transistors can be used. The high-voltage AC generation circuit 32 converts the input square wave drive signal OUT_A into a high-voltage AC voltage that has a sinusoidal waveform.

The high-voltage DC generation circuit 33 is, for example, a flyback circuit as illustrated. Thus, the high-voltage DC generation circuit 33 can have a simple circuit configuration with a small number of components. The high-voltage DC generation circuit 33 converts the input sinusoidal wave drive signal OUT_B into a high voltage DC voltage.

Also, the high-voltage DC generation circuit 33 is preferably a circuit configuration having a transistor 34 as illustrated. A transistor 34 is preferably configured to provide soft switching by inputting the amplification signal OUT_C, which has the sinusoidal waveform, to make a non-saturated region of the base current-collector current of the transistor 34 in the use area. In this manner, a switching loss can be reduced.

The operational amplifier circuit 36 includes an operational amplifier 35. The operational amplifier 35 then provides non-inverting amplification to the sinusoidal wave drive signal OUT_B for driving the transistor 34 so as to generate the amplified signal OUT_C.

Example of Function Configuration of Computing Device

Figure 2:
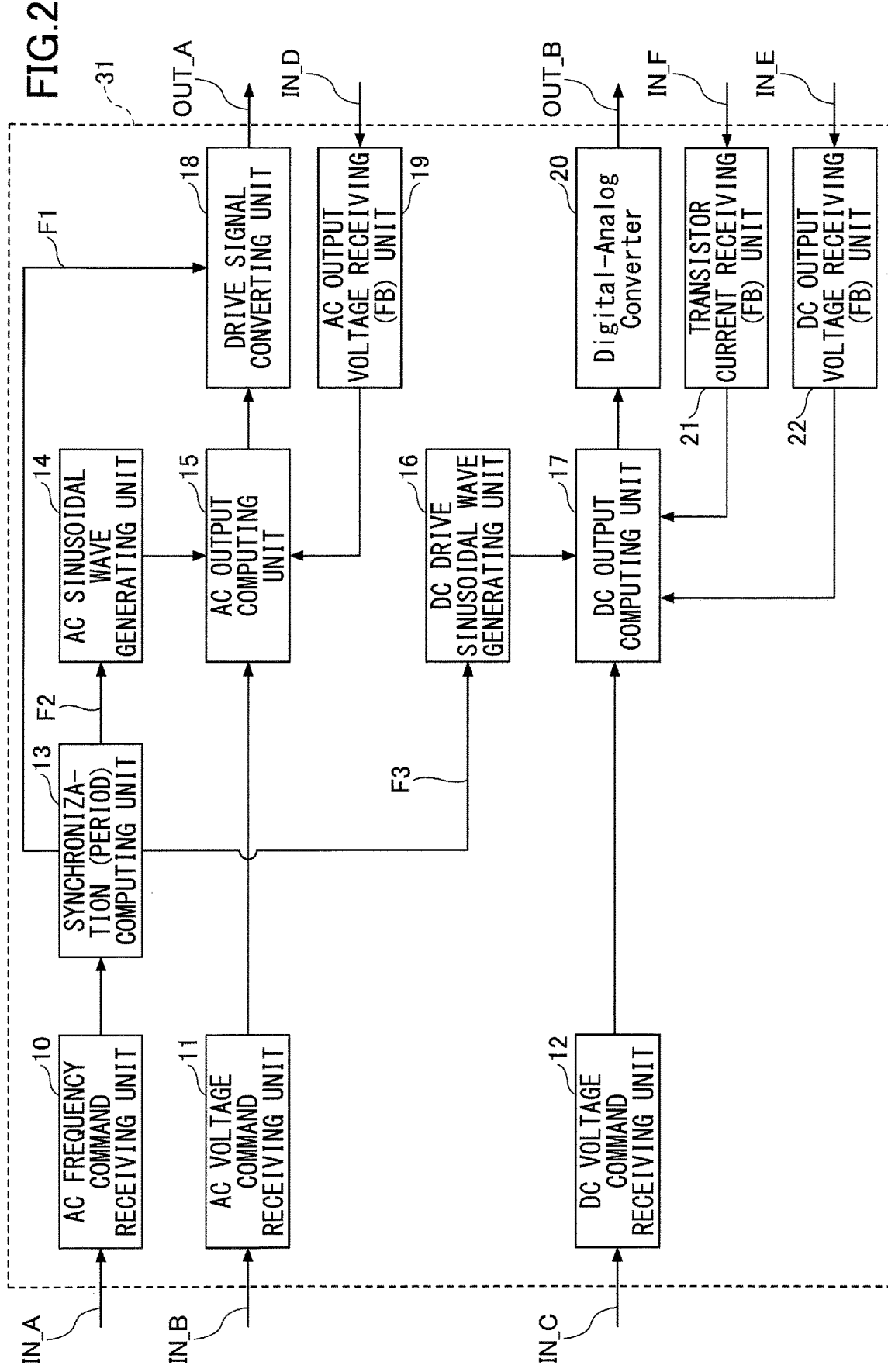
FIG. 2 is a block diagram illustrating an example of a functional configuration example of a computing device.

FIG. 2 is a block diagram illustrating an example of a functional configuration of a computing device. As illustrated in FIG. 1, the CPU 31 has a functional configuration that includes, for example, an AC frequency command receiving unit 10, an AC voltage command receiving unit 11, a DC voltage command receiving unit 12, a synchronization (cycle) computing unit 13, an AC sinusoidal wave generating unit 14, and an AC output computing unit 15. The CPU 31 includes a DC drive sinusoidal wave generating unit 16, a DC output computing unit 17, a drive signal converting unit 18, an AC output power receiving (FB) unit 19 (FB (hereinafter, referred to as "FeedBack"), a Digital-Analog Converter (hereinafter, referred to as "DAC20") 20, a transistor current receiving (FB) unit 21, and a DC output voltage receiving (FB) unit 22.

The AC frequency command receiving unit 10 receives the frequency command IN_A. Based on the frequency command IN_A received by the AC frequency command receiving unit 10, the synchronization (cycle) computing unit 13 calculates an AC drive frequency F1 as an example of the first frequency, an AC sinusoidal wave frequency F2 as an example of the second frequency, and a DC sinusoidal wave frequency F3. The frequency calculation method is described in detail below.

The AC sinusoidal wave generating unit 14 generates a sinusoidal wave that has an AC sinusoidal wave frequency F2.

The AC voltage command receiving unit 11 receives the AC voltage command IN_B. The AC output computing unit 15 calculates the AC output based on the AC voltage command IN_B. Based on the calculation result, the drive signal converting unit 18 outputs the square wave drive signal OUT_A having the AC drive frequency F1.

The AC output computing unit 15 feeds back the output voltage by an AC output voltage signal IN D received by the AC output voltage receiving (FB) unit 19.

The DC voltage command receiving unit 12 receives the DC voltage command IN_C. The DC output computing unit 17 calculates the DC output based on the DC voltage command IN_C. Based on this calculation result, the DAC 20 outputs the sinusoidal wave drive signal OUT_B which becomes the DC sinusoidal wave frequency F3.

Specifically, the DC drive sinusoidal wave generating unit 16 generates a sinusoidal wave, for example, as follows.

First, in the following description, the clock frequency (hereinafter simply referred to as "clock frequency") of the CPU 31 is 180 MHz. The calculation cycle of period is 500 kHz. In addition, the DC sinusoidal wave frequency F3 is calculated to be 50 kHz.

In such a case, the DC drive sinusoidal wave generating unit 16 calculates as follows, for example.

Clock $C1$: 180 MHz/500 kHz=360

Clock $C2$: 180 MHz/50 kHz=3600

Angular velocity $wt$: $p/C2/C1$=0.31415 . . .
≅0.31415

The DC drive sinusoidal wave generating unit 16 generates a sinusoidal wave using an angular velocity calculated as above as an argument of the sinusoidal function. That is, based on the above-described calculation result, the DC drive sinusoidal wave generating unit 16 generates a sinusoidal wave (hereinafter, referred to as the "reference sinusoidal wave") referred to as sin (0.31415).

The CPU 31 preferably has a functional configuration that performs feedback, such as the transistor current receiving (FB) unit 21 and the DC output voltage receiving (FB) unit 22.

The transistor current receiving (FB) unit 21 receives, for example, the transistor current IN_F.

Therefore, the DC output computing unit 17 calculates a value based on the detection result of the transistor current IN_F. According to the calculation result of the DC output computing unit 17, the value obtained by multiplying the sinusoidal wave output by the DC driving sinusoidal wave generation unit 16 is determined. A configuration for controlling the non-saturated region to be the use area by using the feedback of the transistor current IN_F and preventing surge voltage will be described later.

Similarly, the DC output voltage receiving (FB) unit 22 receives the DC output voltage IN_E. In this example, the DC output computing unit 17 calculates a value obtained by multiplying a sinusoidal wave output by the DC drive sinusoidal wave generation unit 16 based on the transistor current IN_F and the DC output voltage IN_E.

Example of Frequency Calculation

Figure 3:
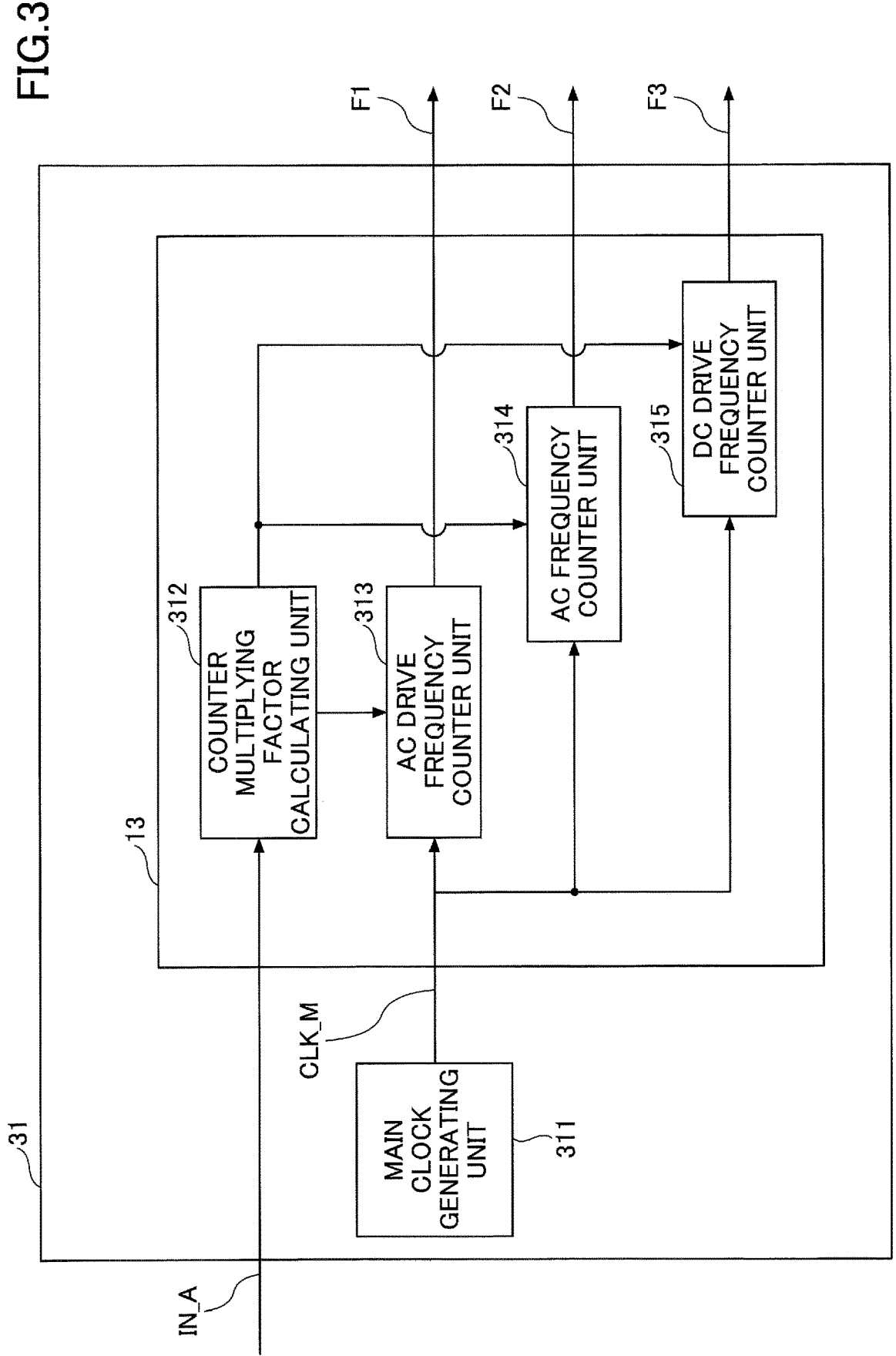
FIG. 3 is a block diagram illustrating an example of calculation of a frequency by the computing device.

FIG. 3 is a block diagram illustrating an example of frequency calculation by a computing device. For example, the synchronization (period) 13 calculates a frequency in a configuration illustrated in the drawing. First, the CPU 31 has a main clock generating unit 311. That is, the CPU 31 performs various operations and controls using the clock signal CLK_M generated by the main clock generating unit 311 as the driving signal, which is an example of the clock signal generation unit. In the following description, the frequency of the clock signal CLK_M is referred to as the "clock frequency".

The counter multiplying factor calculating unit 312 calculates a multiplying factor causing the first frequency, the second frequency, and the third frequency. The multiplying factor of the first frequency calculated by this calculation is input to the AC drive frequency counter unit 313. Similarly, a multiplying factor of the second frequency is input to the AC frequency counter unit 314. A multiplying factor of the third frequency is input to the DC drive frequency counter unit 315.

Hereinafter, the clock frequency is 180 MHz. Here, the command frequency, i.e., the frequency indicated by the frequency command IN_A, is 1021 Hz. The target AC drive frequency is 100 kHz and the target DC sinusoidal wave frequency is 50 kHz. In the following description, the frequencies that are the target values of the first, second, and third frequencies are referred to as "first target frequency," "second target frequency," and "third target frequency." The first target frequency, the second target frequency, and the third target frequency respectively have predetermined values, for example.

It is desirable that the target AC drive frequency and the target DC sinusoidal wave frequency remain constant because variations tend to adversely affect the part heat generation in components and parts and the output waveforms such as ripples.

Under the above conditions, for example, frequency synchronization is performed by the following processes.

Figure 4:
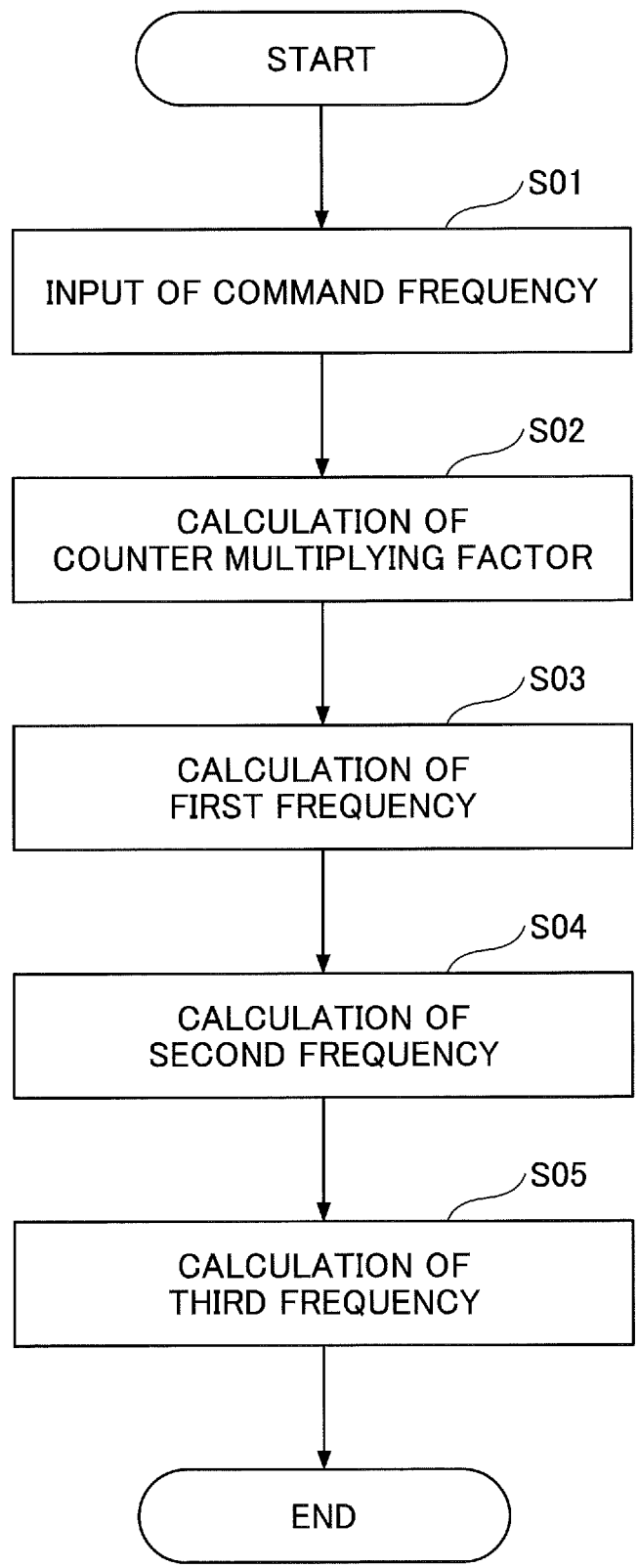
FIG. 4 is a flowchart illustrating an example of frequency calculation.

FIG. 4 is a flowchart illustrating an example of frequency calculation.

In step S01, the CPU 31 enters a command frequency. For example, as illustrated in FIG. 1 or the like, the CPU 31 inputs a command frequency using a frequency command IN_A or the like.

In step S02, CPU 31 calculates the counter multiplying factor.

In step S03, the CPU 31 calculates the first frequency.
In step S04, the CPU 31 calculates the second frequency.
In step S05, the CPU 31 calculates the third frequency.

Specifically, steps S02 to S05 are performed as follows. In the calculation example of equation (6) below, the number to three decimal places is truncated. A provisional counter value for AC drive frequency:

$$Ca\_temp = 180 \text{ MHz} \div 100 \text{ kHz} = 1800 \quad (1)$$

A provisional counter value for command frequency:

$$Cb\_Temp = 180 \text{ Mhz}/1021 \text{ Hz} = 176297.7 \ldots \cong 176298 \quad (2)$$

The first multiplying factor of AC drive frequency and command frequency:

$$n1 = Cb\_temp/Ca\_temp = 97.9433 \ldots \cong 98 \quad (3)$$

$$\text{Deduction rate: } G = 97.9433 \ldots /98 \ldots \cong 0.99942 \quad (4)$$

Counter value for AC drive frequency:

$$Ca = Ca\_temp \times G = 1798.96 \ldots \cong 1799 \quad (5)$$

Calculation of the adopted value of the first frequency AC drive frequency:

$$F1 = 180 \text{ MHz}/1799 = 100.055 \text{ kHz} \ldots \cong 100.05 \text{ kHz} \quad (6)$$

Calculation of the adopted value of the second frequency AC sinusoidal wave frequency:

$$F2 = 180 \text{ MHz} \div 176302 = 1020.975 \text{ Hz} \ldots \cong 1020.97 \text{ Hz} \quad (7)$$

Counter value for command frequency:

$$Cb = 1799 \times 98 = 176302 \quad (8)$$

Calculation of the adopted value of the third frequency DC sinusoidal wave frequency:

$$F3 = 180 \text{ MHz} \div 3598 = 50.027 \ldots \cong 50.02 \text{ kHz} \quad (9)$$

Counter value for DC sinusoidal wave frequency:

$$Cc = 1799 \times 2 = 3598 \quad (10)$$

In the above calculation example, the first frequency, i.e., the AC drive frequency F1, is the highest of the first frequency, the second frequency, and the third frequency. First, as illustrated in equation (5) above, the counter value for realizing the AC drive frequency F1 (hereinafter referred to as the "first counter value") is calculated. When the signal is generated using the first counter value calculated in this way (in the example above, 1799), the first target frequency is 100 kHz, while the first target frequency is 100.05 kHz, as illustrated in equation (6) above, is an example in which the frequency 100.05 kHz is adopted as the first frequency.

Next, as illustrated in equation (8) above, the first counter value is multiplied by the first multiplying factor (which is an integer of "98" in the example above) to calculate the counter value (hereinafter referred to as the "second counter value") for realizing the AC sinusoidal wave frequency F2. Calculated in this way, as illustrated in equation (7) above, the AC sinusoidal wave frequency F2 is an example in which the frequency 1020.97 Hz is adopted as the second frequency, while the second target frequency is 1021 Hz.

Then, as illustrated in equation (10) above, the counter value (hereinafter referred to as the "third counter value") for realizing the DC sinusoidal wave frequency F3 is calculated by multiplying the first counter value by the second multiplying factor (in the example above, an integer of "2"). When the signal is generated using the third counter value calculated in this way, as illustrated in equation (9) above, the DC sinusoidal wave frequency F3 is an example in which the frequency of 50.02 kHz is adopted as the third frequency, while the third target frequency is 50 Hz.

For example, reset is performed using the counter value calculated as above.

Figure 5:
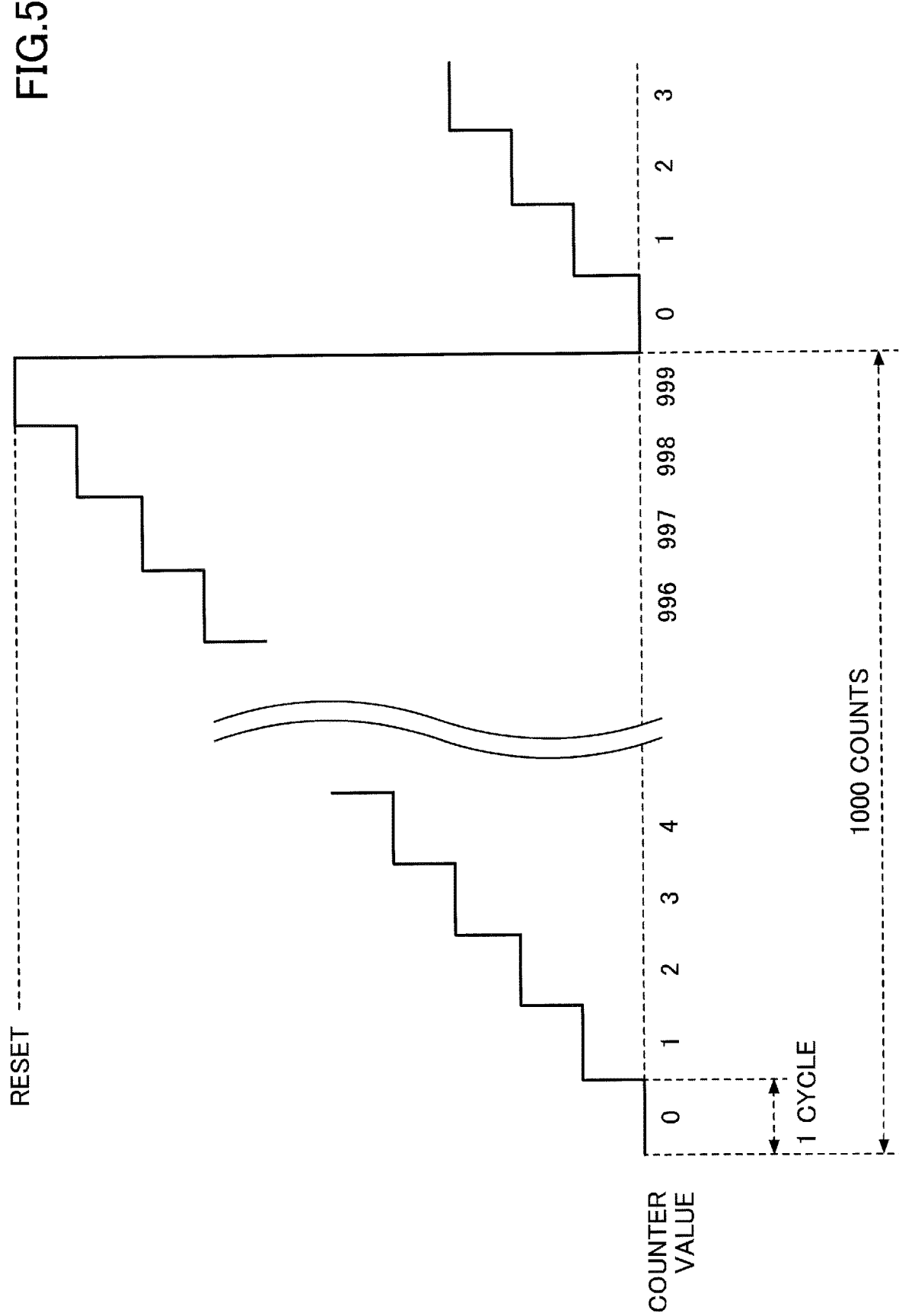
FIG. 5 is a diagram illustrating an example of resetting.

FIG. 5 is a diagram illustrating a reset example. Similar to the above example, if the main clock frequency is 180 MHz, the "switching 1" of the counter value (the value indicated by the "counter value" in the figure) to count the main clock becomes the switching 5.55 . . . ns. As illustrated, the counter value is counted up each time one switching of a time for counted value elapses.

For example, if it is desired to achieve a frequency of "180 kHz", the timing of the "reset" illustrated in the figure, that is, the counter value becomes "999," and when the frequency is reset every 1000 counts, a signal that becomes "180 kHz" can be generated.

Figure 6:
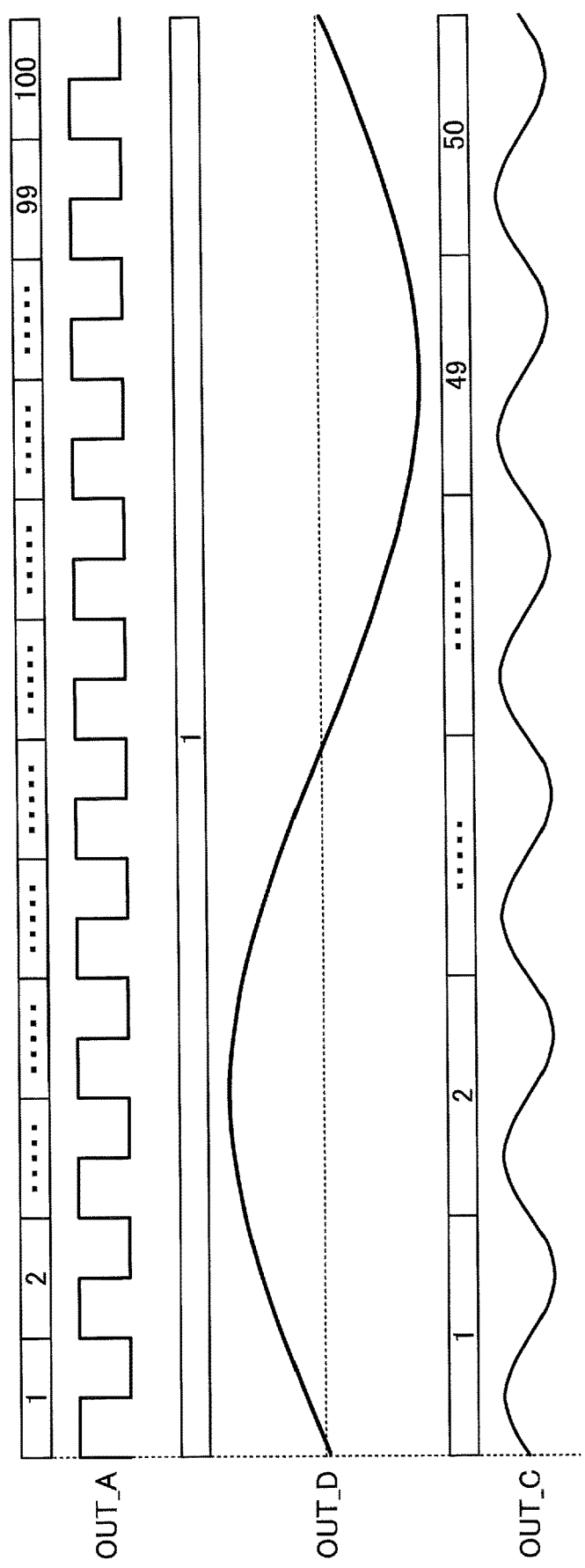
FIG. 6 is a diagram illustrating an example of synchronization of the signals of a first frequency, a second frequency, and a third frequency.

FIG. 6 is a diagram illustrating an example in which the signals of the first frequency, the second frequency, and the third frequency are synchronized. By employing the frequencies calculated in the above calculations, the first frequency, the second frequency, and the third frequency can be synchronized, for example, as illustrated.

Specifically, when the signal is generated using the first counter value calculated as described above, the square wave driving signal OUT_A illustrated in the FIG. 6 is generated.

In the circuit configuration illustrated in FIG. 1, the high-voltage AC generation circuit 32 amplifies the voltage of the input square wave driving signal OUT_A by switching. Next, the high-voltage AC generation circuit 32 converts the square-wave drive signal OUT_A, which is a pulse modulation wave, by a low-pass filter, and generates the AC output signal OUT_D, which is a sinusoidal wave of the second frequency. However, because it is often impossible to remove all frequency components in low-pass filtering, ripples are often included as components in the AC output signal OUT_D.

Meanwhile, when the signal is generated using the third counter value calculated as above, the amplified signal OUT_C as illustrated is generated.

Accordingly, as illustrated in the figure, both the square wave drive signal OUT_A, the AC output signal OUT D, and the amplification signal OUT_C are frequencies calculated based on the clock frequency, as illustrated in the above calculation example. Therefore, as illustrated, the square wave drive signal OUT_A, the AC output signal OUT_D, and the amplified signal OUT_C are synchronized.

Thus, the frequencies of the synchronized signals are less likely to interfere with one another. Therefore, for example, when the power supply apparatus is applied to the image forming apparatus, it is possible to prevent color irregularity or the like caused by the interference of the frequencies, and to prevent the formation of an abnormal image by reducing the interference of the frequency.

When a frequency calculated as described above is used, for example, the following is obtained.

Figure 7A:
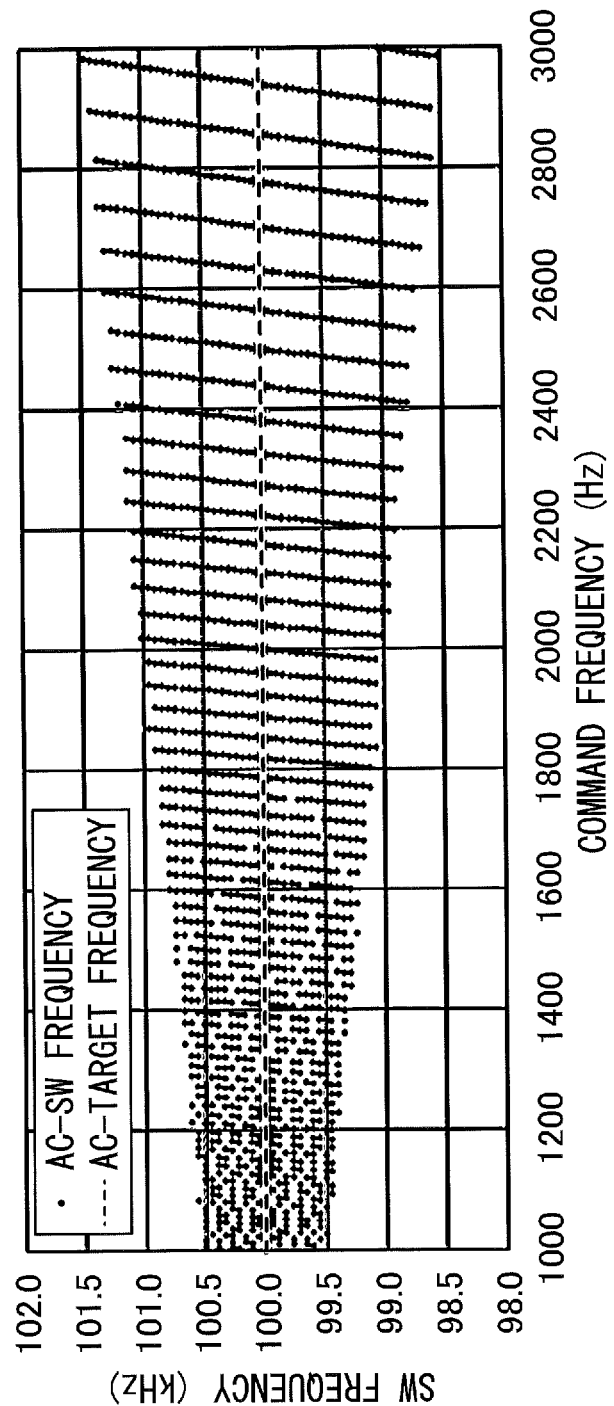
FIGS. 7A-7C illustrate inspection results of the first frequency, the second frequency, and the third frequency.
Figure 7B:
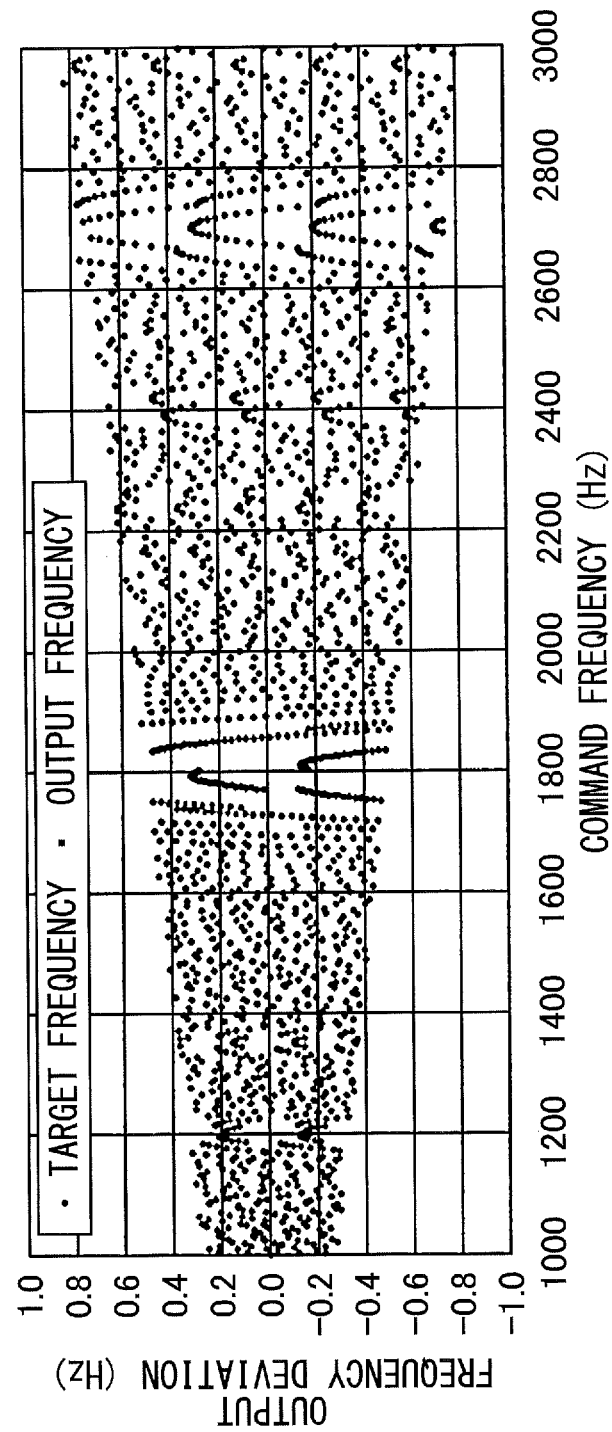
Figure 7C:
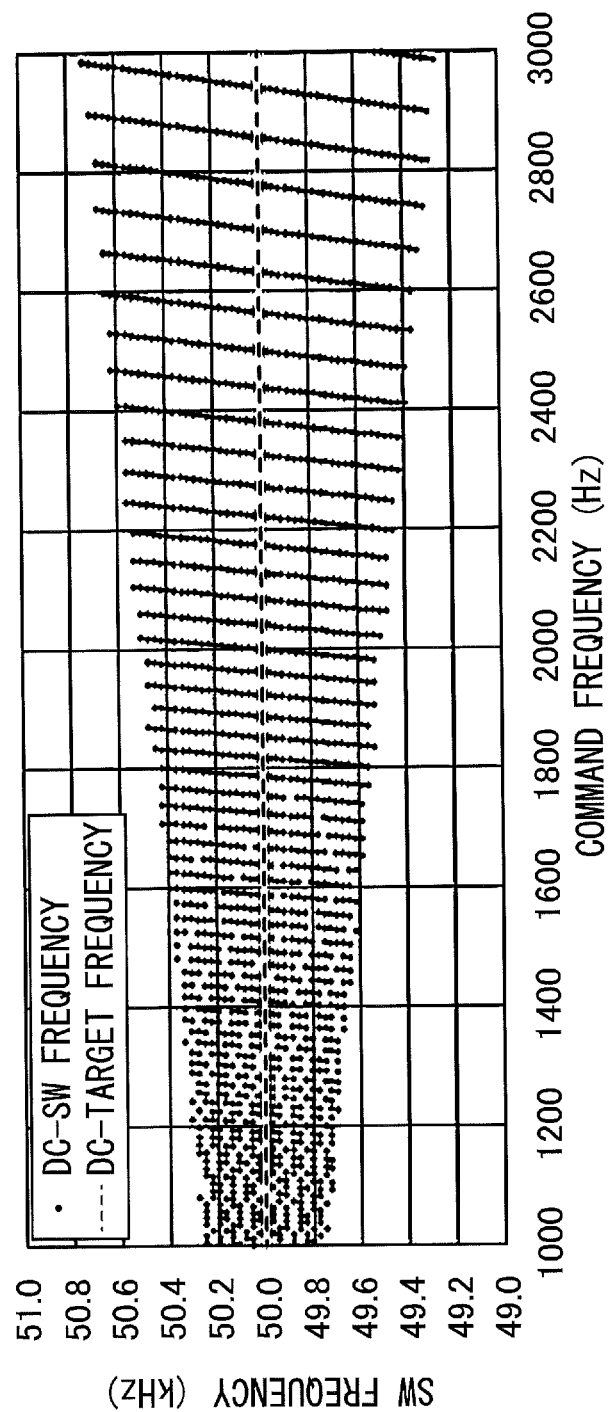

FIGS. 7A-7C are a diagram illustrating the experimental results of the first frequency, second frequency, and the third frequency. The illustrated example illustrates the first, second, and third frequencies when the frequency is varied from 1000 Hz to 3000 Hz by each 1 Hz in the computational method described above.

As described above, the computing unit calculates and adopts a frequency that does not completely match the frequency specified by the frequency command. As described above, the computing unit calculates such that the first frequency, the second frequency, and the third frequency are synchronized. Specifically, as illustrated in the above calculation, the first frequency, the second frequency, and the third frequency are calculated based on the same clock frequency. In this manner, the first frequency, the second frequency, and the third frequency are all integer multiples of the clock frequency.

For example, synchronizing the first, second, and third frequencies in this manner can reduce frequency interference.

Further, a circuit configuration as illustrated in FIG. 1 can reduce the circuit size compared to a method using a divider or the like. This prevents an increase in a circuit cost.

It is desirable that the power supply apparatus has the following configuration.

Example 1 of Configuration to Prevent Surge Voltage

The transistor 34 of the high-voltage DC generation circuit 33 is preferably controlled to perform the following operations.

Figure 8:
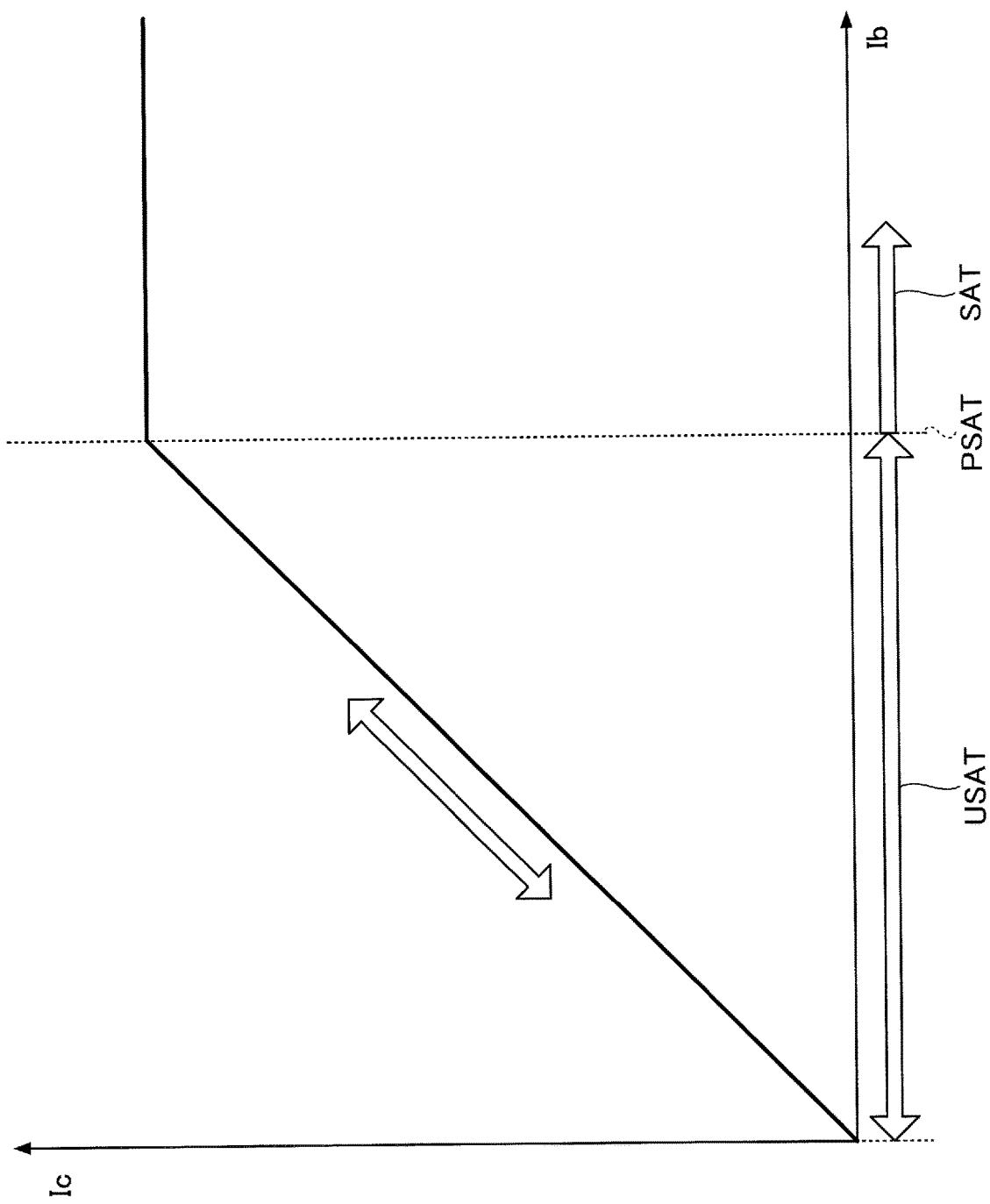
FIG. 8 is a diagram illustrating an example of a use area.

FIG. 8 is a diagram illustrating an example of a use area. FIG. 8 illustrates a correlation between a base current Ib (represented by a horizontal axis in the figure) and a collector current Ic (represented by a vertical axis in the figure) in the transistor 34. The power supply apparatus is controlled so that a region below the saturation point PSAT (hereinafter, referred to as "non-saturated region USAT") becomes the use area. That is, even if the base current Ib greater than the saturation point PSAT is applied, no larger collector current Ic than the current at the saturation point PSAT is output. Hereinafter, the region in which the collector current Ic is saturated is referred to as the "saturated region SAT". For example, the collector current Ic is reset to "0" every period so that the primary side of a transformer of the high-voltage DC generation circuit 33 does not saturate with the DC current. Specifically, the surge voltage is prevented from occurring by, for example, the following circuit configuration.

Figure 9:
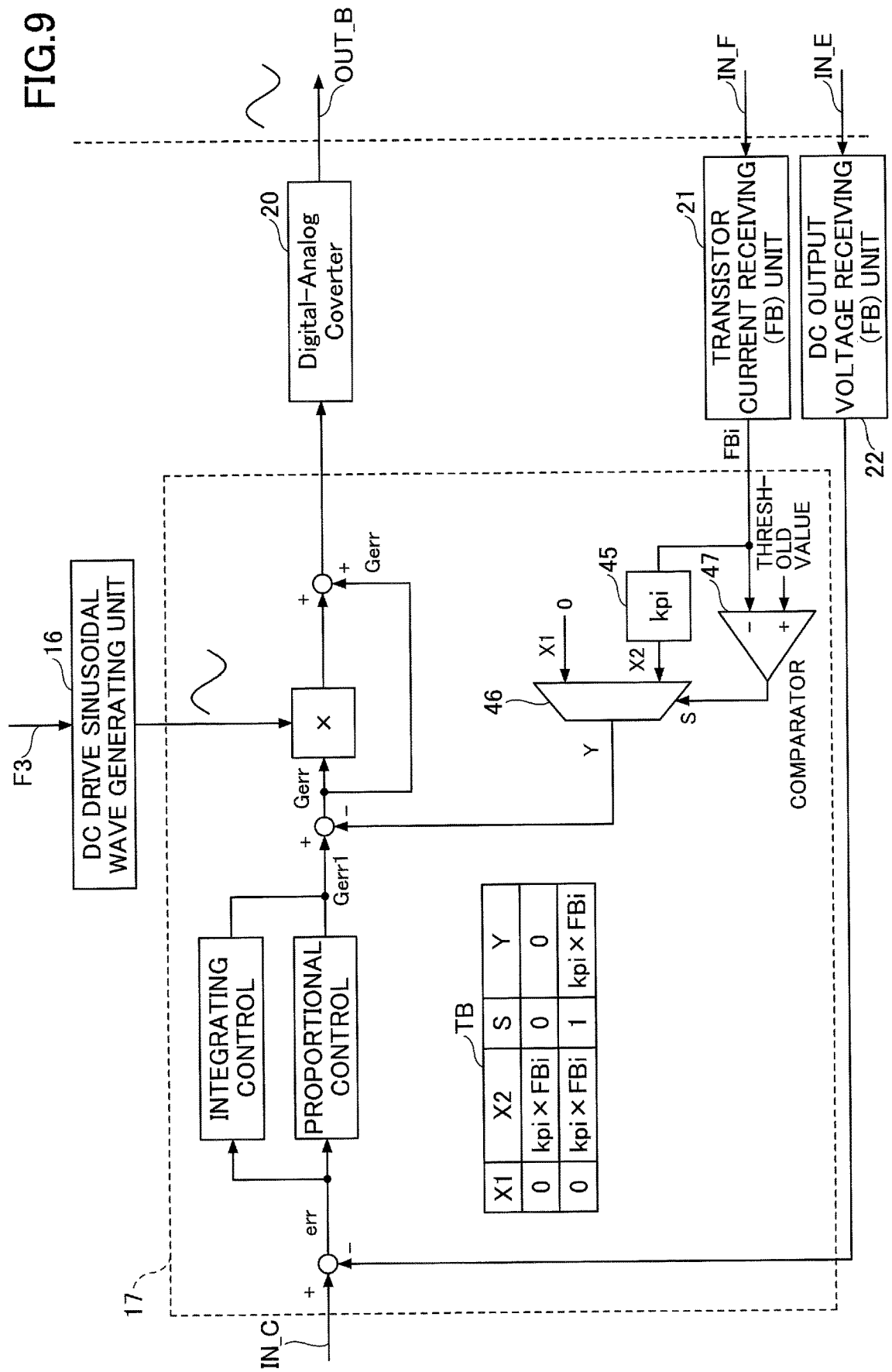
FIG. 9 is a circuit diagram illustrating an example of a circuit configuration for preventing a surge voltage.

FIG. 9 is a circuit diagram (first) illustrating an example of a circuit configuration that prevents surge voltage. For example, the DC output computing unit 17 is configured as illustrated.

First, the DC voltage command IN_C is input to the DC output computing unit 17. As a basic operation, the DC output computing unit 17 controls the difference between the DC voltage actually output, that is, the voltage indicated by a DC output voltage IN_E and the voltage indicated by the DC voltage command IN_C.

Specifically, the DC output computing unit 17 first compares and subtracts the DC output voltage IN_E and the DC voltage command IN_C. The proportional gain and the accumulated gain (referred to as "Gerr1" in the figure) are then multiplied by the sinusoidal wave generated by the DC drive sinusoidal wave generating unit 16.

The DC output computing unit 17 adds a DC bias so that the sinusoidal wave is not less than "0 V." Accordingly, when the DC bias is set to "Gerr2," the sinusoidal wave drive signal OUT_B is controlled as in an equation (11) below in the circuit configuration illustrated in the figure.

Sinusoidal wave drive signal $$OUT\_B = Gerr2 \times \sin(\omega t) + Gerr \quad Gerr = Gerr1 \quad (11)$$

The results of the conversion of the output described in equation (11) above by the DAC 20 are input to the operational amplifier circuit 36.

In the circuit configuration illustrated in the figure, in order to make the usage region of the transistor 34 a non-saturated region, first, the transistor current IN_F is acquired by the transistor current receiving (FB) unit 21 Hereinafter, the current value acquired by the transistor current receiving (FB) unit 21, that is, the collector current Ic of the transistor 34, is set to "FBi".

Next, the DC output computing unit 17 determines whether the transistor current IN_F is saturated. Specifically, in the configuration illustrated in the figure, the DC output computing unit 17 determines whether the transistor current IN_F is saturated using the comparator 47. The comparator 47 compares "threshold" with "FBi". Accordingly, when the current value of the saturation point PSAT is set to the "threshold value," it is known whether the transistor current IN_F is saturated. That is, when the transistor current IN_F is a "threshold value," that is, a current exceeding the current value of the saturation point PSAT, it is determined that the transistor current IN_F is saturated. As described above, when the current is saturated, that is, when the current is over-current, the DC output computing unit 17 controls the current by switching by the switch 46 as follows.

The switch 46 has two inputs, "X1" and "X2", as illustrated in Table TB. Then, the comparator 47 switches between "X1" and "X2" to "Y" of the output of the switch 46 based on the comparison result. The switch 46 is represented by "S" in table TB. As illustrated, if "S" is "O", then the output "Y" is "X1". On the other hand, if "S" is "1," the output "Y" is "X2."

Because "X1" is set to "0" as illustrated, when "S" is "0," the output "Y" is "0," i.e., no current control is performed. That is, when the non-saturated region is the use area based on the value of the transistor current, "S" is set to "0" because the current is not specifically controlled.

On the other hand, when the transistor current IN_F is saturated, "S" is "1," and the output "Y" is the value obtained by multiplying "FBi" by the proportional gain "kpi" using the multiplier 45. That is, the adjustment amount "kpi×FBi" causes the current not to be saturated, the current is limited.

The above control can be illustrated, for example, as follows.

Figure 10:
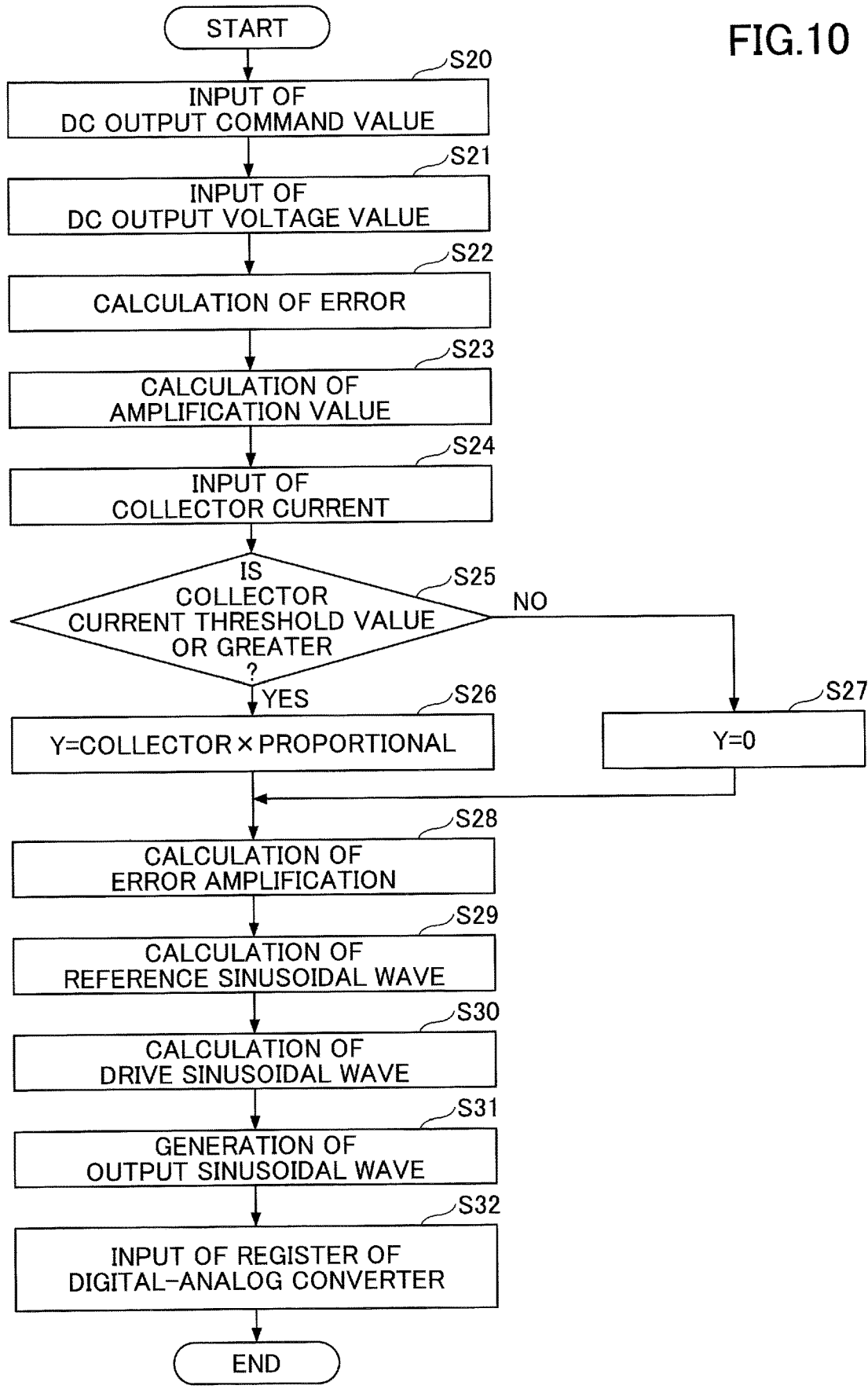
FIG. 10 is a flowchart illustrating a process example for preventing a surge voltage.

FIG. 10 is a flowchart illustrating an example of a process for preventing the surge voltage.

In step S20, the DC output computing unit 17 inputs the DC output command value. Specifically, the DC voltage command IN_C determines the target value of the DC voltage output on the DC side.

In step S21, the DC output computing unit 17 inputs the DC output voltage value. Specifically, the present DC voltage is known by feeding back "FBi".

In step S22, the DC output computing unit 17 calculates an error. That is, the error is the difference between the target DC output command value and the current DC output voltage value. Accordingly, the error is calculated based on step S20 and step S21, for example, as in the following equation (12). Error err=DC output command value refv− DC output voltage value fbv (12). In step S23, the DC output computing unit 17 calculates an amplification value. The amplification value corresponds to "Gerr1" in FIG. 9. The amplification value is calculated as, for example, equation (13) below.

$$\text{Gerr1}=err \times kp+ki \times \int err \, dt \qquad (13)$$

As described above, a PI control of the voltage feedback controls to reduce the error.

In step S24, the DC output computing unit 17 inputs the collector current Ic. That is, in FIG. 9, "FBi" is acquired by the transistor current receiving (FB) unit 21.

In step S25, the DC output computing unit 17 determines whether or not the collector current Ic is equal to or more than the threshold value. That is, it is determined whether or the collector current Ic is saturated.

Next, when the collector current is equal to or greater than the threshold value (YES in step S25), the DC output computing unit 17 proceeds to step S26.

On the other hand, if the collector current is not greater than the threshold value (NO in step S25), the DC output computing unit 17 proceeds to step S27.

In step S26, the DC output computing unit 17 sets the output "Y" of the switch 46 to "collector current×proportional gain". That is, in FIG. 9, when the comparator 47 sets "S" to "1," the output "Y" becomes "FBi×kpi".

In step S27, the DC output computing unit 17 sets the output "Y" of the switch 46 to "0". That is, in FIG. 9, when the comparator 47 sets "S" to "0," the output "Y" becomes "0."

In step S28, the DC output computing unit 17 calculates an error amplification. The error amplification corresponds to "Gerr" in FIG. 9. The error amplification is calculated as, for example, equation (14) below.

$$\text{Gerr}=\text{Gerr1}-Y \qquad (14)$$

Accordingly, when the collector current is saturated, that is, when it is determined that the collector current is YES in step S25, because "Y=FBi×kpi" is obtained in step S26, the above-described (14) is as illustrated in the following equation (15).

$$\text{Gerr}=\text{Gerr1}-(FBi \times kpi) \qquad (15)$$

In step S29, the DC output computing unit 17 computes the reference sinusoidal wave. The reference sinusoidal wave is calculated as "sin (wt)".

In step S30, the DC output computing unit 17 calculates a drive sinusoidal wave. The drive sinusoidal wave is the sinusoidal wave obtained by multiplying the reference sinusoidal wave by "Gerr".

In step S31, the DC output computing unit 17 generates an output sinusoidal wave. The output sinusoidal wave is the sinusoidal wave indicated by the sinusoidal wave drive signal OUT_B in FIG. 9. The output sinusoidal wave is generated, for example, as in equation (16) below.

$$\text{Output sinusoidal wave}=\text{drive sinusoidal wave}+\text{Gerr} \qquad (16)$$

In step S32, the DC output computing unit 17 inputs a register of the DAC. For example, a function, etc. of equation (16) above is input to the register of DAC.

By performing the above control, the sinusoidal wave drive signal OUT_B can output the following output sinusoidal wave.

Figure 11:
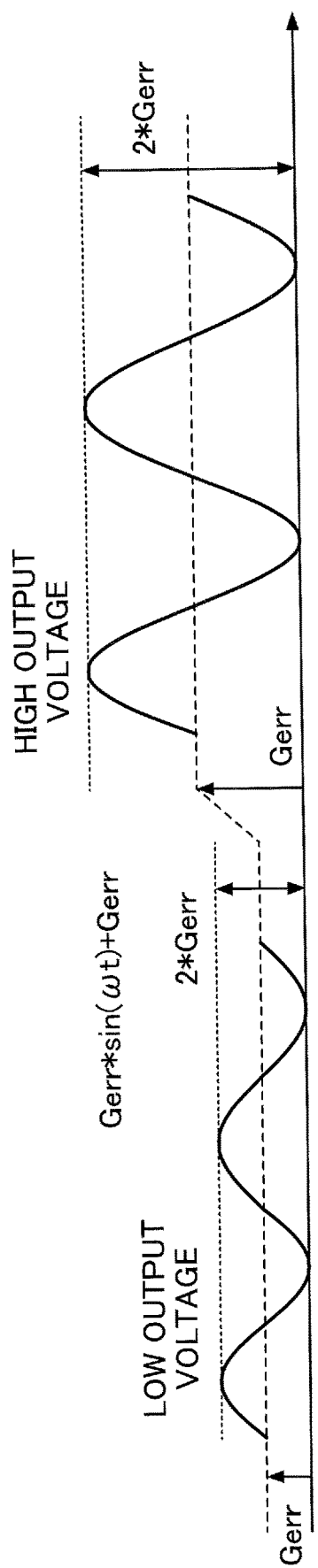
FIG. 11 is a diagram illustrating an output example output from a circuit for preventing the surge voltage.

FIG. 11 is a diagram illustrating an example of an output from a circuit for preventing surge voltage. That is, an output sinusoidal wave as illustrated is input to the operational amplifier circuit 36.

In the above configuration, the transistor current can be used in the non-saturated region in the high-voltage DC generation circuit 33. Thus, the so-called surge voltage can be suppressed. Therefore, for example, when the power supply apparatus is applied to the image forming apparatus, the color irregularity caused by the interference of the frequency by the surge voltage can be prevented, and the abnormal image can be formed by reducing the interference of the frequency.

In addition, with such a configuration, the circuit size can be reduced compared to a case where a protection circuit such as a snubber circuit and a circuit for suppressing surge voltage is used. This prevents an increase in circuit cost.

Example 2 of Configuration to Prevent Surge Voltage

It is also desirable to provide an additional configuration to suppress the generation of surge voltages described below.

Figure 12:
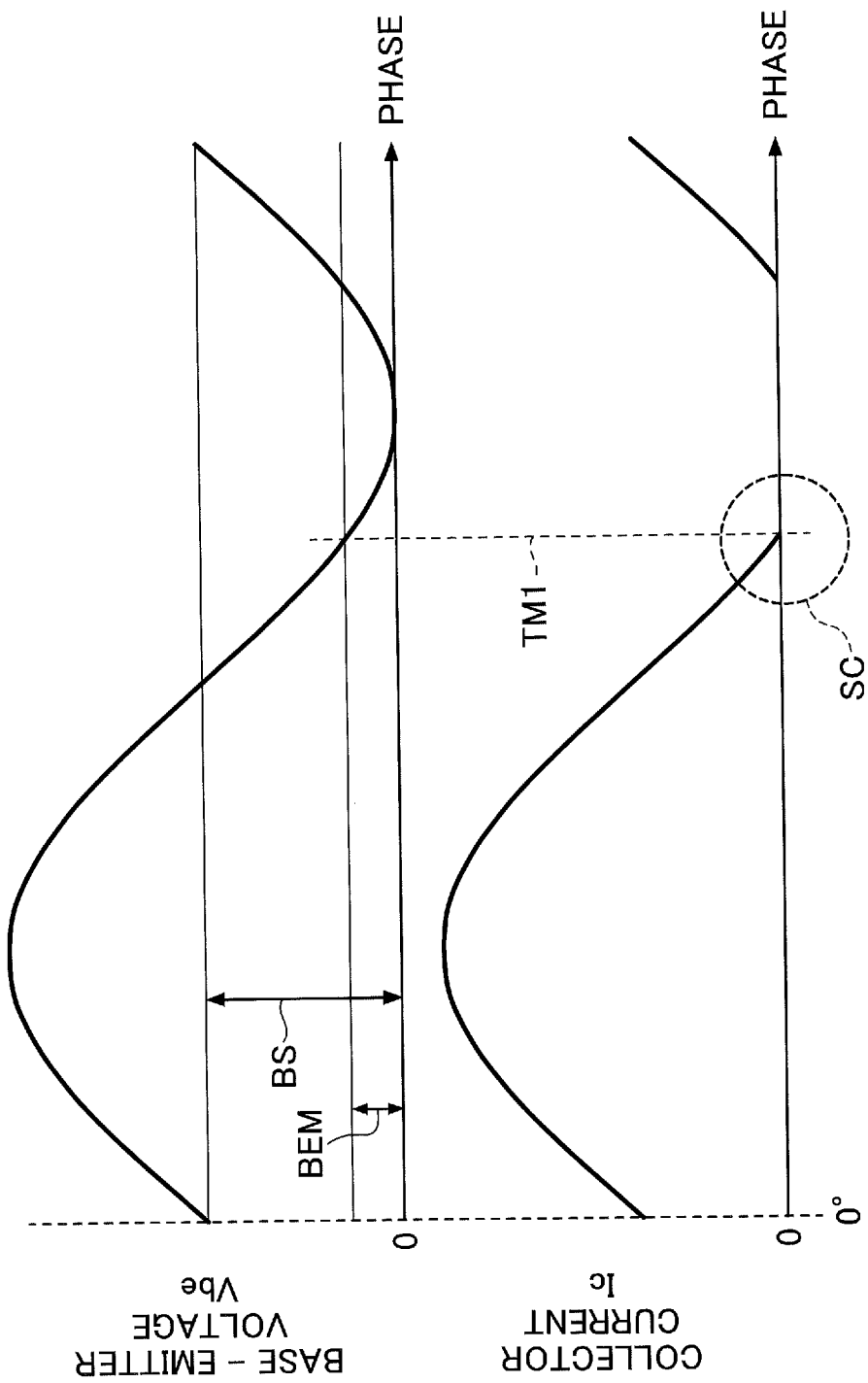
FIG. 12 is a diagram illustrating an example in which a surge voltage is likely to be generated.

FIG. 12 is a diagram illustrating an example in which a surge voltage may be generated. For example, if the base-emitter voltage Vbe and the collector current Ic illustrated in the FIG. 12 are the first timing TM1, that is, the collector current Ic is the value illustrated in the FIG. 12 (hereinafter referred to as the "surge generation point SC"), a surge voltage may be generated.

Therefore, a DC bias BS is applied to the base-emitter voltage Vbe so that the collector current Ic is not less than "0". Specifically, a control is performed as follows, for example.

Figure 13:
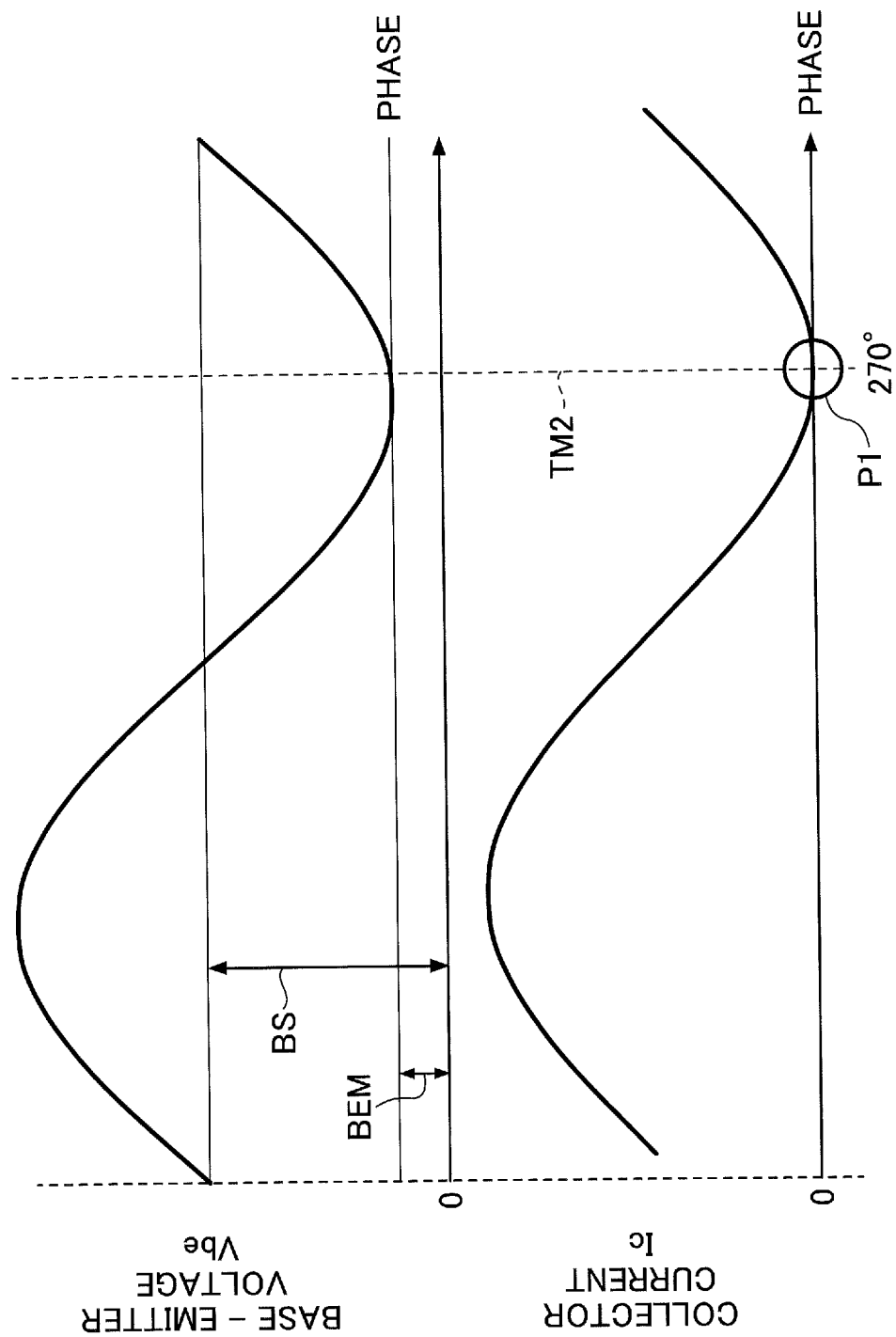
FIG. 13 illustrates an example of resetting the collector current to 270 degrees.

FIG. 13 is a diagram illustrating an example of resetting the collector current to 270 degrees. Compared to FIG. 12, FIG. 13 differs from FIG. 12 in that a base-emitter voltage Vbe is raised to the bottom by the lowest base-emitter voltage BEM depending on the DC bias BS so that the collector current Ic is not less than "0".

Figure 14:
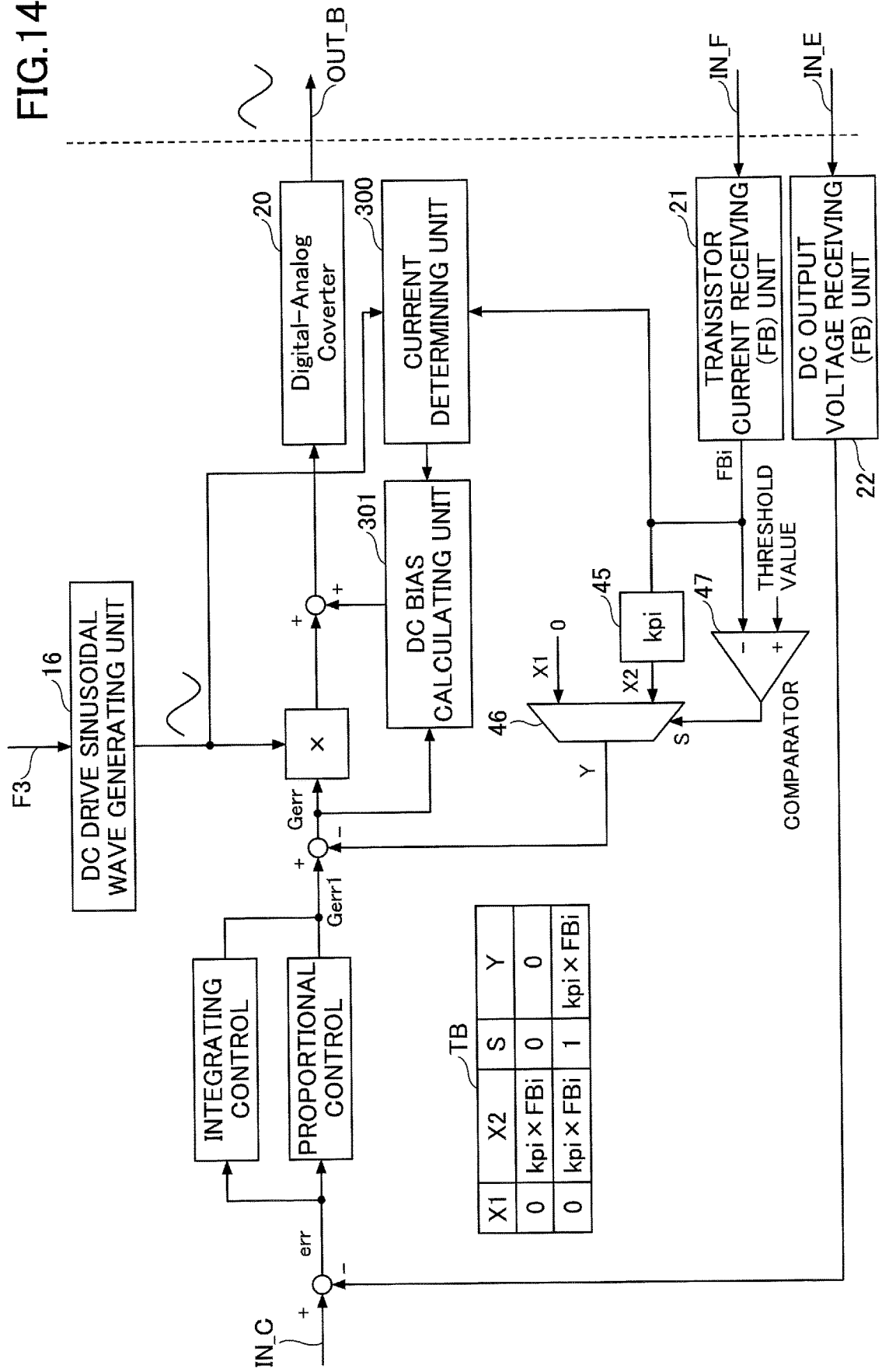
FIG. 14 is a circuit diagram illustrating an example of a circuit configuration for preventing the surge voltage.

The lowest value of the collector current Ic occurs at the second timing TM2, that is, a point with a phase of 270 degrees (hereinafter, referred to as a "reset point P1"). Thus, it is desirable for the power supply apparatus to set the DC bias BS such that the sinusoidal wave drive signal OUT_B oscillates at or above the minimum base-emitter voltage BEM and reset the collector current Ic to "0" at the reset point P1. For example, the power supply apparatus may reset the collector current Ic at a timing of 270 degrees in phase by the following circuit configuration FIG. 14 is a circuit diagram (Part 2) illustrating an example of a circuit configuration that prevents the surge voltage. Compared to FIG. 9, the illustrated configuration differs in that there is a current determining unit 300 and a DC bias calculating unit 301.

The current determining unit 300 acquires a transistor current, that is, a collector current Ic. The DC bias calculating unit 301 sets the DC bias BS such that the reset of the collector current Ic is at the timing of 270 degrees of phase, as illustrated in FIG. 13, for example. Accordingly, when the DC bias is set to "ofs," the sinusoidal wave drive signal OUT_B is controlled as in equation (17) below in the circuit configuration illustrated in the figure.

Sinusoidal wave drive signal $$OUT\_B = Gerr \times \sin(wt) + ofs \quad (17)$$

This prevents saturation of the primary side of the transformer. Therefore, the surge voltage can be suppressed. Therefore, for example, when the power supply apparatus is applied to the image forming apparatus, the color irregularity caused by the interference of the frequency by the surge voltage can be prevented, and the abnormal image can be formed by reducing the interference of the frequency.

Example of Configuration to Prevent Surge Voltage

The configuration for preventing the surge voltage may be as follows.

Figure 15:
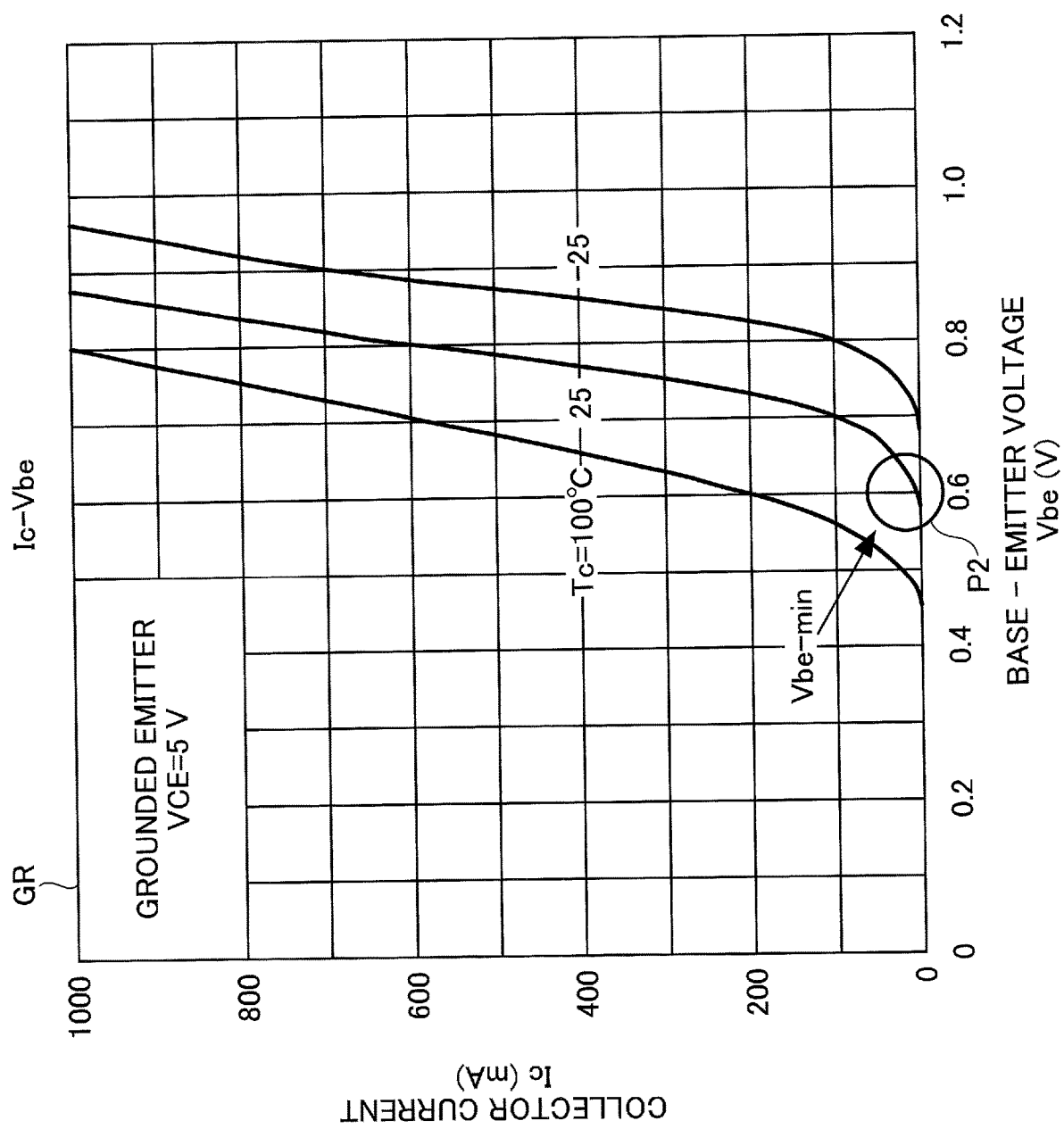
FIG. 15 illustrates an example of a base-emitter voltage to be measured in an inspection.

FIG. 15 is a diagram illustrating an example of a base-emitter voltage to be measured in the inspection. The graph GR illustrates the relationship between the base-emitter voltage Vbe and the collector current Ic. Results such as those illustrated in the graph GR can be obtained by the inspection before the power supply apparatus is activated. The graph GR illustrates the minimum base-emitter voltage. Specifically, a point at which the collector current Ic is "0" (hereinafter referred to as the "minimum voltage point P2") indicates the minimum base-emitter voltage. Thus, for example, the inspection may be performed in the following configuration and the minimum base-emitter voltage is stored in advance.

Figure 16:
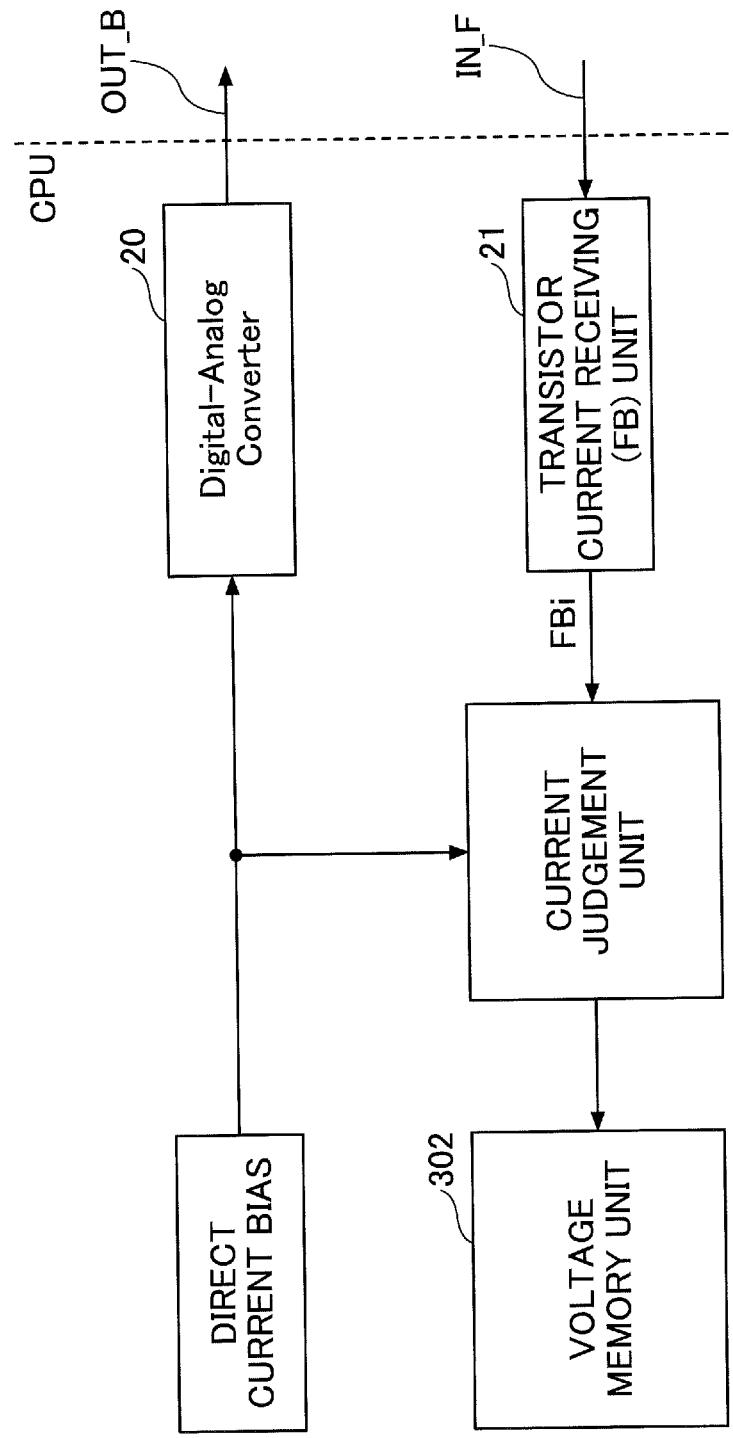
FIG. 16 illustrates an example of a configuration using a base-emitter voltage.

FIG. 16 is a diagram illustrating an example of a configuration using the base-emitter voltage. That is, when inspected, the minimum base-emitter voltage is known. The power supply apparatus stores the minimum base-emitter voltage obtained in the inspection in the voltage memory unit 302.

As described above, the voltage memory unit 302 for storing the minimum base-emitter voltage is used to make a circuit configuration as follows.

Figure 17:
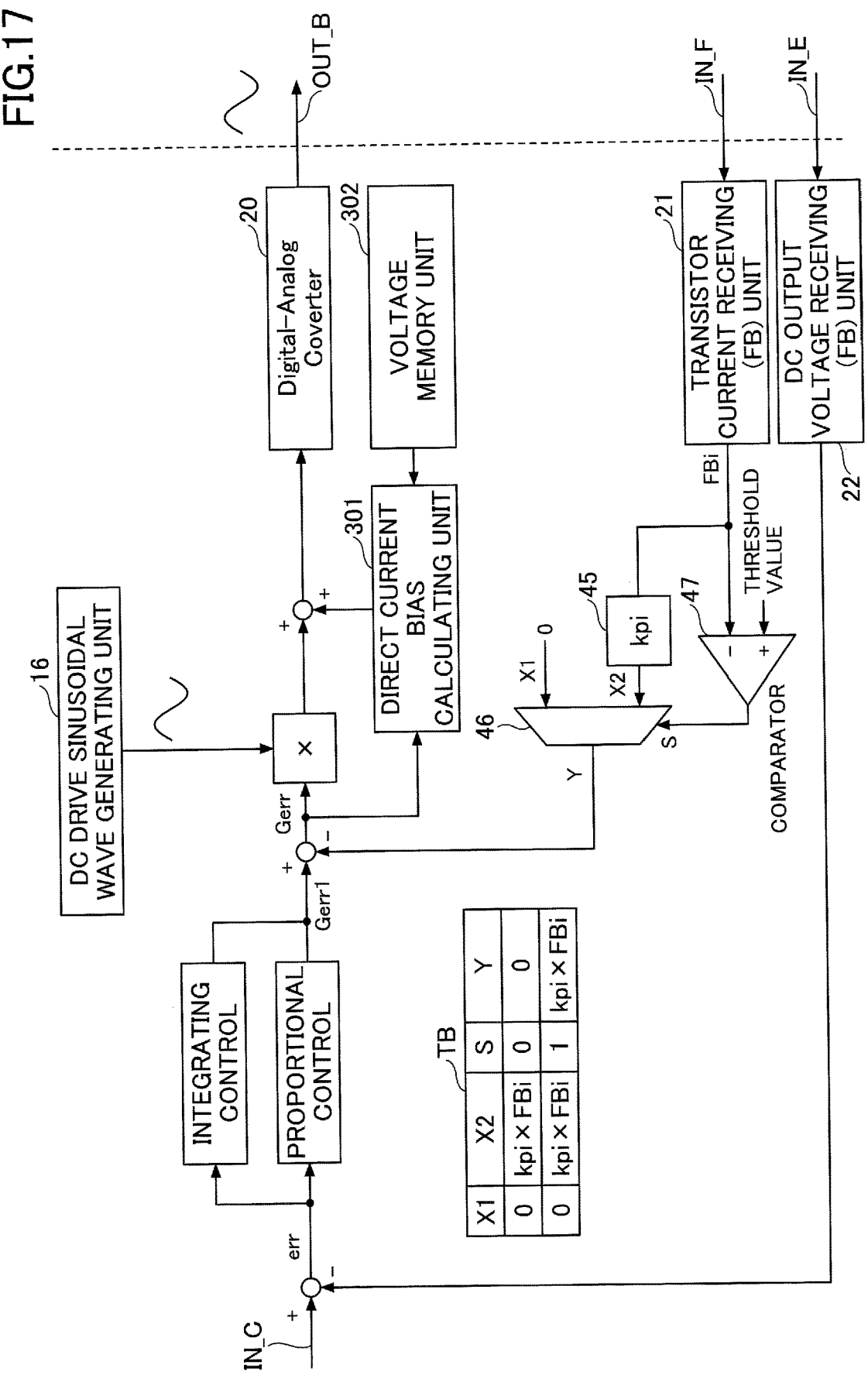
FIG. 17 is a circuit diagram illustrating an example of a circuit configuration using the base-emitter voltage.

FIG. 17 is a circuit diagram illustrating an example of the circuit configuration using the base-emitter voltage. Compared to FIG. 14, the illustrated configuration differs in that it includes a voltage memory unit 302.

The DC bias calculating unit 301, for example, sets the DC bias BS such that the reset of the collector current Ic is set to a timing of 270 degrees in phase in a manner similar to FIG. 14. In this configuration, the value of the lowest base-emitter voltage stored by the DC bias BS is set.

Even in such a configuration, when the DC bias is set to "ofs" as in FIG. 14, the sinusoidal wave drive signal OUT_B is controlled as in equation (17) above in the circuit configuration illustrated in FIG. 17.

Thus, the primary side of the transformer can be prevented from being saturated even with the illustrated configuration. Therefore, the surge voltage can be suppressed. Thus, for example, when the power supply apparatus is applied to the image forming apparatus, color irregularities or the like caused by the interference of the frequencies by the surge voltage can be prevented, and the formation of an abnormal image can be prevented by reducing the interference of the frequency.

Example 4 for Preventing Surge Voltage

It is also desirable to provide a configuration that suppresses the generation of surge voltages as follows.

Figure 18:
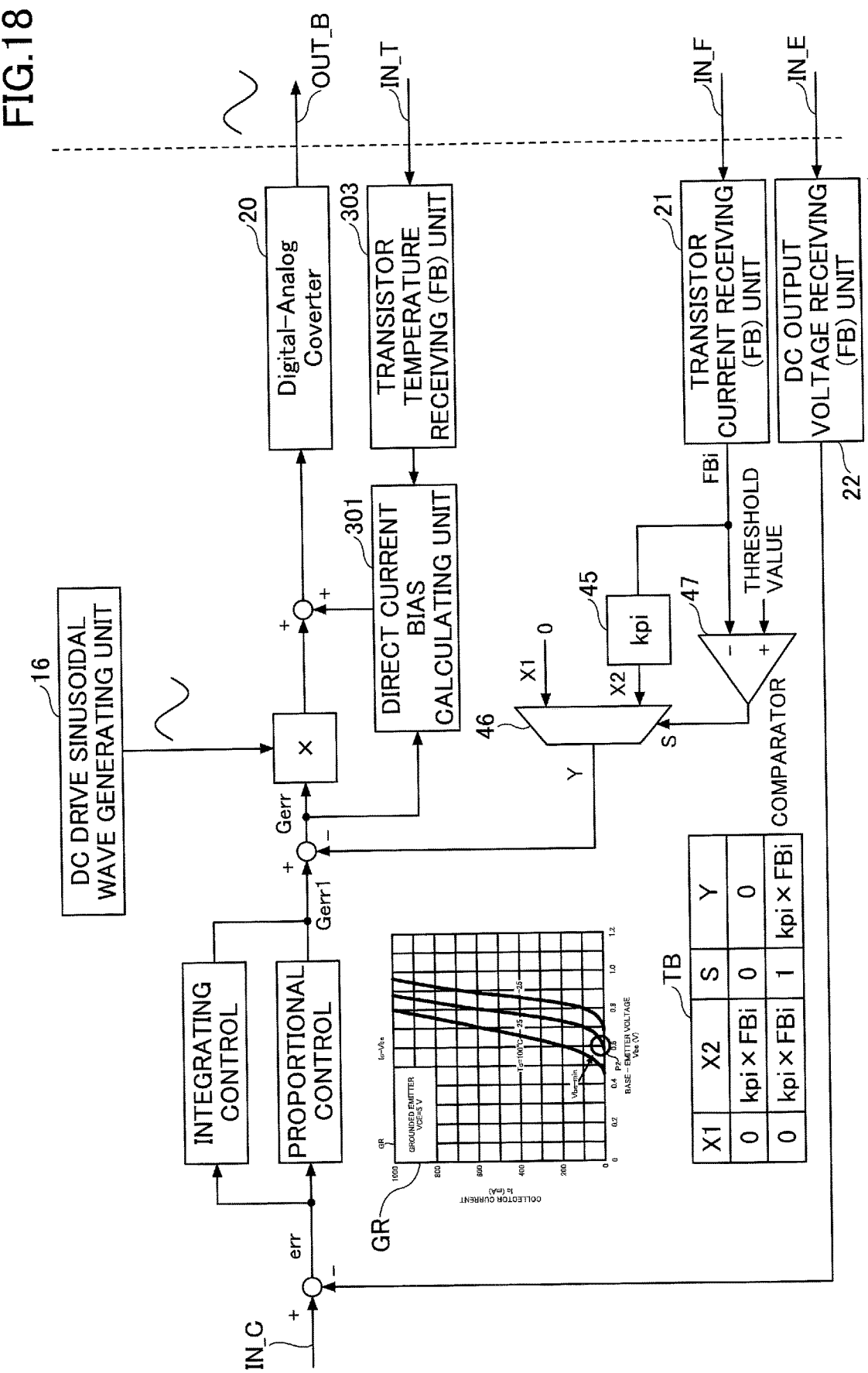
FIG. 18 is a circuit diagram illustrating an example of a circuit configuration using a transistor temperature.

FIG. 18 is a circuit diagram illustrating an example of a circuit configuration using a transistor temperature. Compared to FIG. 17, the configuration illustrated in the figure differs in that it further includes a transistor temperature receiving (FB) unit 303.

The transistor temperature receiving (FB) unit 303 acquires the temperature IN_T of the transistor 34. For example, the temperature IN_T of transistor 34 is detected by a temperature sensor or the like.

The calculation of the temperature IN_T is not limited to the temperature sensor. For example, the temperature IN_T may be calculated from the thermal resistance and power consumption of each transistor. Alternatively, the temperature IN_T may be calculated based on the applied power and the temperature of a casing that packages the transistor 34 and the like.

The transistor 34 often has so-called temperature characteristics, the characteristics of which vary with temperature. For example, the base-emitter voltage varies with temperature IN_T. Accordingly, when the DC bias calculating unit 301 calculates the DC bias by feeding back the temperature IN_T and taking the temperature characteristics into consideration, it is possible to accurately calculate the DC bias such as oscillating at the lowest base-emitter voltage BEM or more, for example, as illustrated in FIG. 13.

Therefore, the surge voltage can be suppressed. For example, when the power supply apparatus is applied to the image forming apparatus, color irregularities or the like caused by the interference of the frequency by the surge voltage can be prevented, and the formation of an abnormal image can be prevented by reducing the interference of the frequency.

Example 5 for Preventing Surge Voltage

The threshold used by comparator 47 is preferably set as follows, for example.

Figure 19:
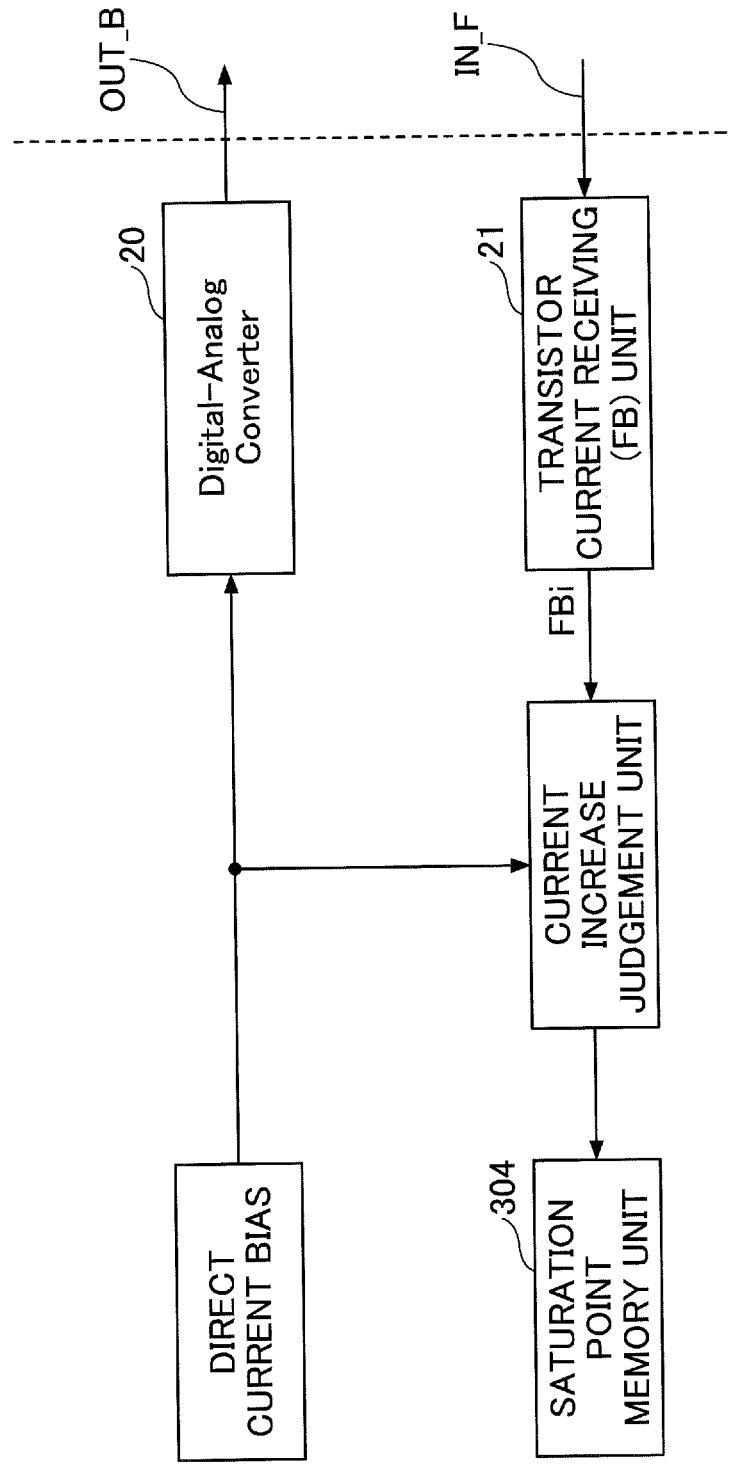
FIG. 19 is a diagram illustrating an example of a configuration using a saturation point.

FIG. 19 is a diagram illustrating an example of a configuration using the saturation point. The illustrated configuration is that prior to using the power supply, in so-called inspections. In the configuration shown, the transistor current receiving (FB) unit 21 acquires the transistor current IN_F, that is, the collector current "FBi" In the inspection, the base voltage is increased. The transistor current IN_F is acquired for each base voltage.

In this way, when the base voltage is increased but "FBi" is not increased, it can be understood that the collector current Ic reaches the saturation point PSAT. The information of the saturation point PSAT obtained in the inspection is stored in the saturation point memory unit 304.

The saturation point PSATs may vary from part to part. That is, the saturation point PSAT may differ from transistor to transistor. Therefore, as illustrated in the figure, it is preferable to examine the saturation point PSAT of each transistor in advance and store it in the saturation point memory unit 304. Accordingly, it is desirable that the saturation point memory unit 304 stores the saturation point PSAT for each transistor.

As described above, the saturation point memory unit 304 for storing the saturation point PSAT is used, for example, in a circuit configuration as follows.

Figure 20:
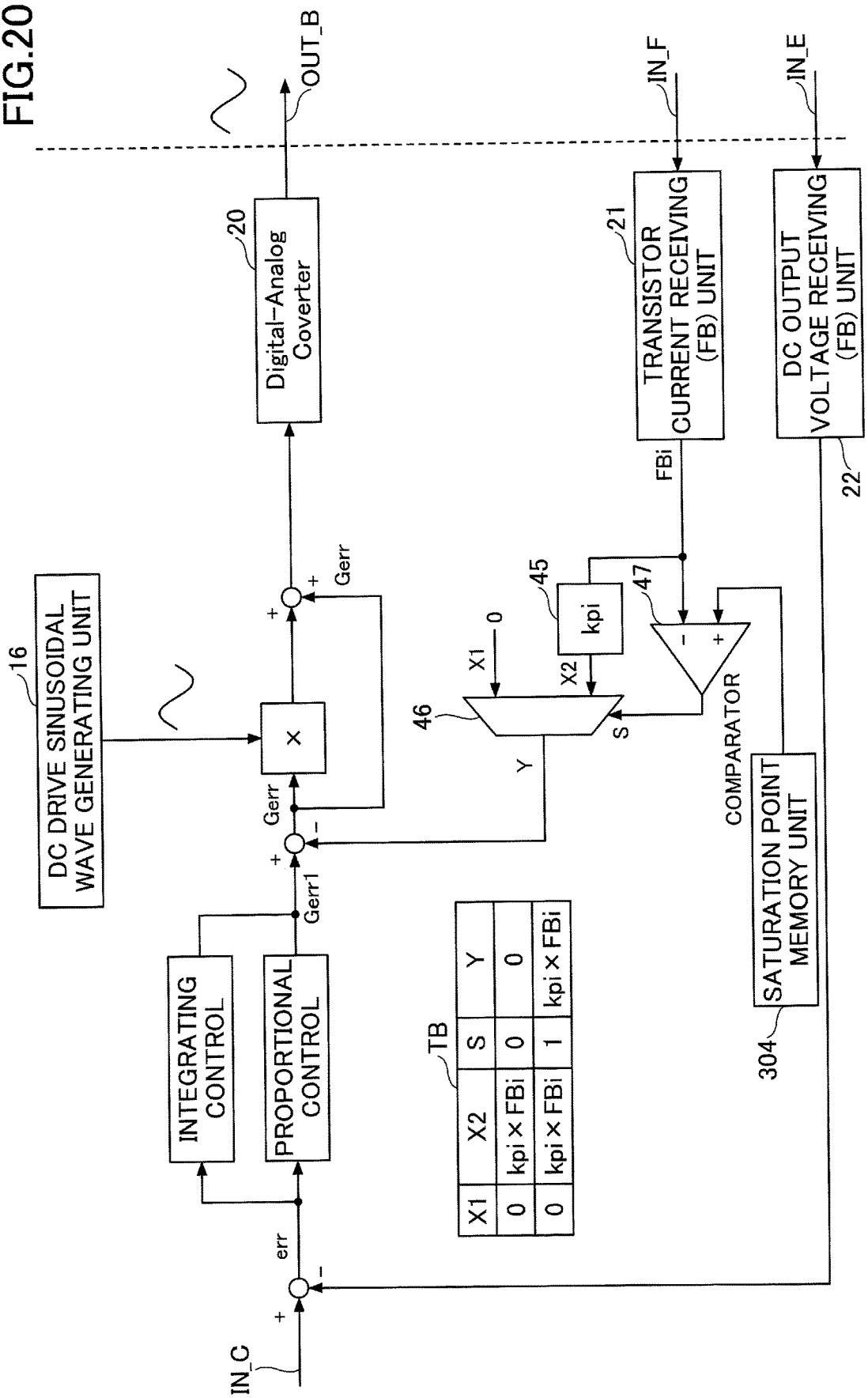
FIG. 20 is a circuit diagram illustrating the example of the circuit configuration using a saturation point.

FIG. 20 is a circuit diagram illustrating an example of a circuit configuration using a saturation point. Compared to FIG. 9, the illustrated configuration differs in that the saturation point PSAT stored in the saturation point memory unit 304 is set to a "threshold value" of the comparator 47.

With such a configuration, the non-saturated region USAT can be used accurately based on the characteristics of each transistor, for example, as illustrated in FIG. 8. Further, with such a configuration, the transformer of the high-voltage DC generation circuit 33 can be miniaturized.

Example

Figure 21:
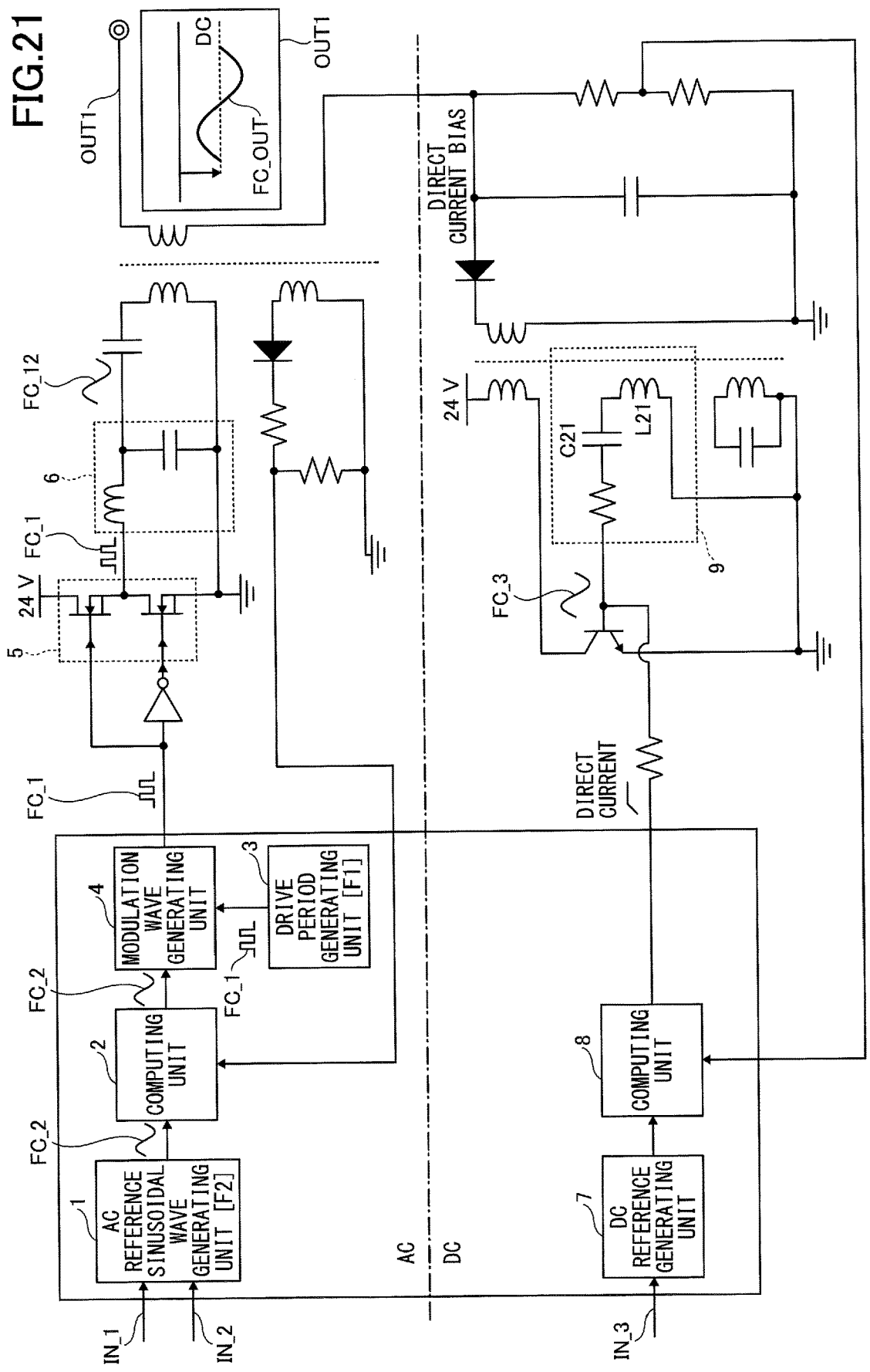
FIG. 21 is a circuit diagram illustrating a comparative example.

FIG. 21 is a circuit diagram (part 1) illustrating a comparative example. In this configuration, the frequency command IN_1 and the AC output voltage command IN_2 are first input from the outside. Then, based on the frequency command IN 1 and the AC output voltage command IN_2, the AC reference sinusoidal wave generating unit 1 generates a sinusoidal wave (hereinafter, referred to as the "AC reference sinusoidal wave") of the frequency FC_2 represented by the frequency command IN_1.

Next, the computing unit 2 compares the AC reference sinusoidal wave and the feedback of the output result to generate a control signal.

The drive period generating unit 3 generates a signal for driving a pulse modulation wave that becomes a period FC_1.

Subsequently, the modulation wave generating unit 4 compares the control signal generated by the computing unit 2 with a signal generated by the drive period generating unit 3 for driving the pulse modulation wave so as to generate the pulse modulation wave. The pulse modulation wave generated by the modulation wave generating unit 4 is subjected to voltage amplification by the switching 5.

Next, the low pass filter 6 converts the pulse modulation wave of the period FC_1 output from the switching 5 into a sinusoidal wave. This sinusoidal wave essentially has a period FC 2, but the low pass filter 6 often cannot completely remove all the frequency components. Therefore, the sinusoidal wave output from the low pass filter 6 often has the period FC 12 including the ripple of the period FC_1.

Meanwhile, the DC side inputs the DC output voltage command IN_3 from the outside. The DC reference generation unit 7 generates a sinusoidal wave (hereinafter, referred to as "DC reference sinusoidal wave") based on the DC output voltage command IN_3.

Next, the computing unit 8 compares the DC reference sinusoidal wave and the feedback of the output result so as to generate the control signal (DC).

Then, the capacitor C21 and the coil L21 of the circuit 9 oscillate and drive the transistor to perform the output.

Subsequently, smoothing is accomplished by a low pass filter, i.e., capacitor and resistor. However, the low pass filter cannot completely remove all the frequency components, so the period FC_3 is included as a ripple.

In such a circuit configuration, the frequency FC_OUT of the final output OUT1 is as follows.

Figure 22:
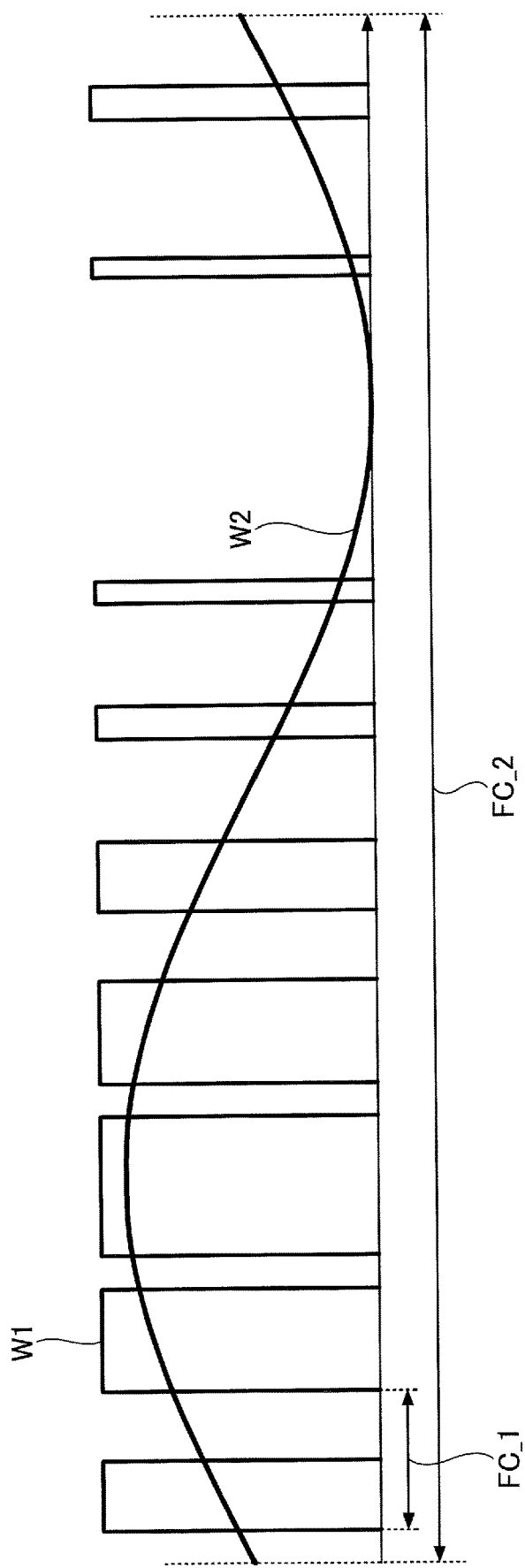
FIG. 22 illustrates an example of a frequency in the comparative example.

FIG. 22 is a diagram illustrating an example of a frequency in a comparative example.

The waveform W1 is an example of a signal for the pulse modulation wave drive generated by the drive period generating unit 3. On the other hand, the waveform W2 is an example of the AC reference sinusoidal wave generated by the AC reference sinusoidal wave generating unit 1. In this example, the period of a waveform W1 becomes a period FC_1. In this example, the period of a waveform W2 becomes a period FC_2.

The frequency FC_OUT of the output OUT1 is a frequency component of a combination of the period FC_1, the period FC_2, and the period FC_3. This can be illustrated, for example, as follows.

Figure 23:
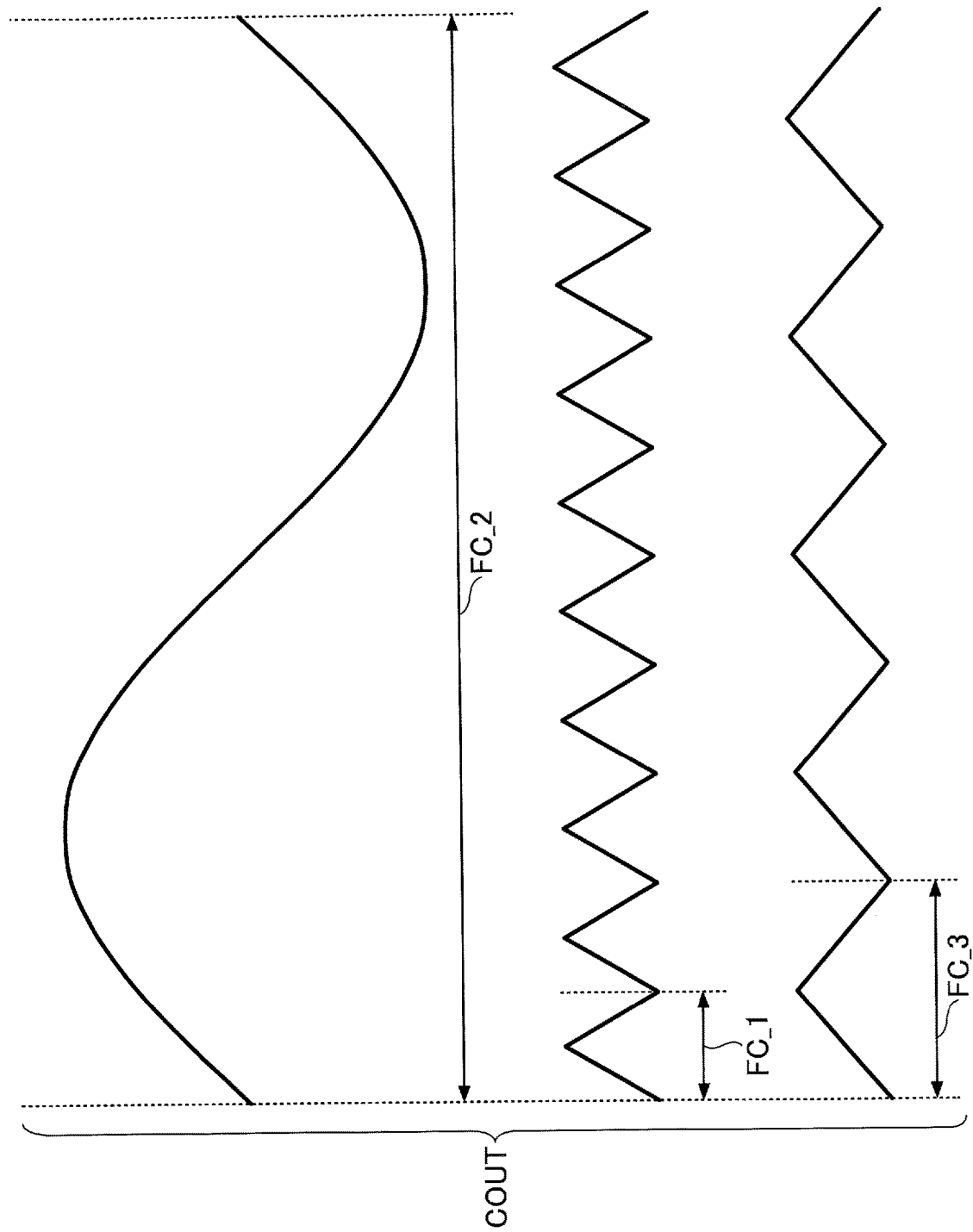
FIG. 23 is a diagram illustrating an example of an output in the comparative example.

FIG. 23 is a diagram illustrating an output example in a comparative example.

Therefore, the frequency FC_OUT of the output OUT1 is the frequency component COUT of the period FC_1, the period FC_2, and the period FC_3. Therefore, the frequency FC_OUT of the output OUT1 can be represented as in the following equation (18).

$$\text{Output } OUT1 = (AC \text{ side}) \text{ Cyclic } FC\_2 + (AC \text{ side ripple}) \text{ Cyclic } FC\_1 + (DC \text{ side ripple}) \text{ Cyclic } FC\_3 \qquad (18)$$

Thus, when the frequency components of the period FC_1, the period FC_2, and the period FC_3 are included, frequency interference is likely to occur if the period FC_1, the period FC_2, and the period FC_3 are not synchronized. Therefore, when the power supply apparatus is applied to the image forming apparatus, an abnormal image is easily generated.

In addition, the period FC_3 is susceptible to a load factor, a variation of the constant of a capacitor C21, a variation of the constant of a coil L21, and a temperature change. This may cause abnormal images to be generated.

Thus, for the synchronization, a circuit configuration such as the following may be considered.

Figure 24:
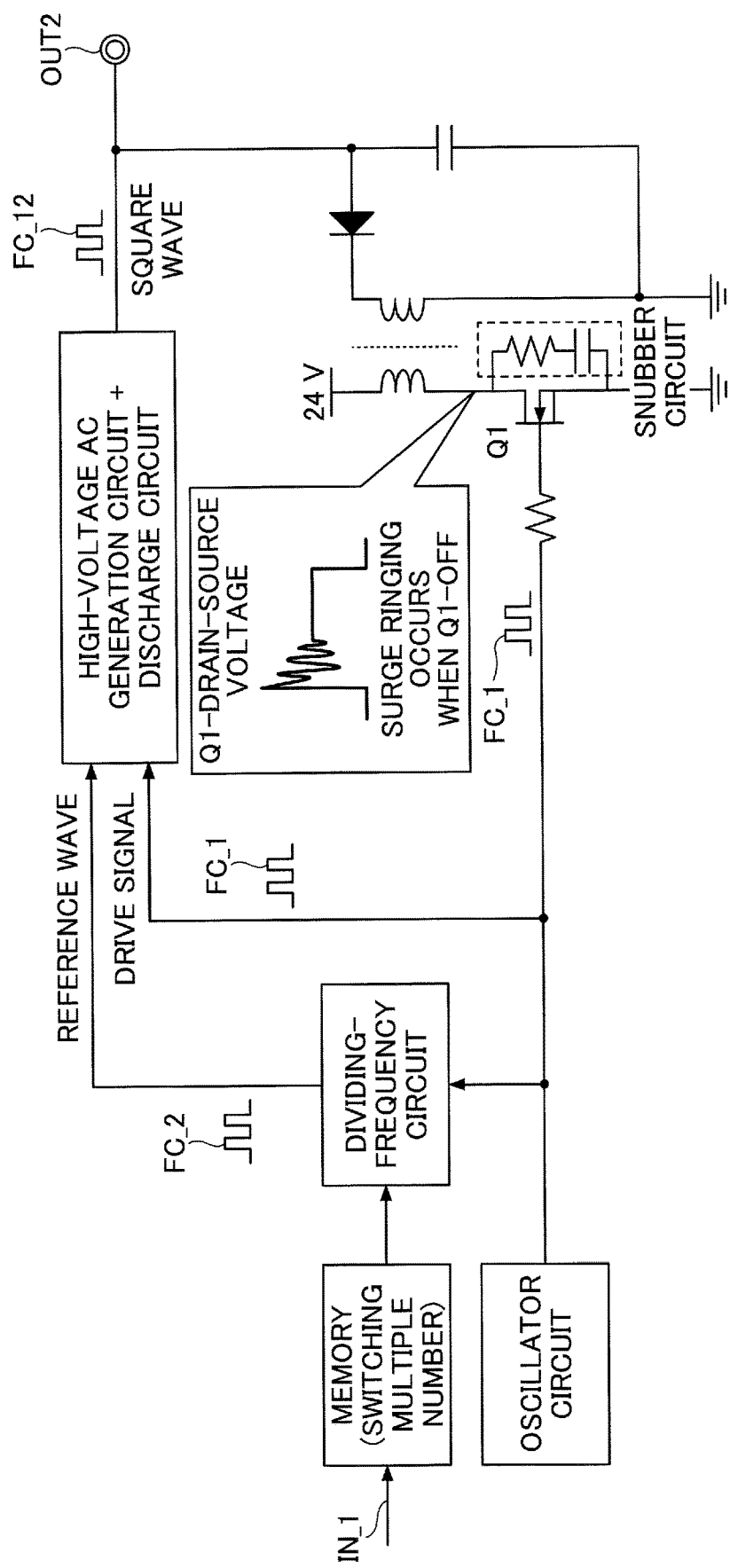
FIG. 24 is a circuit diagram illustrating the comparative example.

FIG. 24 is a circuit diagram (Part 2) illustrating a comparative example. In the comparative example illustrated in FIG. 24, a configuration in which the drive signals of the AC side and the DC side are output with reference to the cyclic FC_1 as the reference. In this comparative example, the period of the signal of the period FC_1 output from the oscillation circuit is multiplied by an integral number using a frequency divider circuit, and the output waveform on the AC side (referred to as a "square wave" in the figure) is generated.

In this comparative example, the drive signal of the period FC_1 is used on both the AC side and the DC side).

The low-pass filter on the AC side may become large. In other words, the circuit size is likely to be large so as to cause an increase in the circuit cost. When the period is short, a switching loss is likely to occur in the illustrated transistor Q1. In addition, circuits for heat countermeasures are often required, and the circuit size is likely to be large. Therefore, it is likely to lead to an increase in circuit cost.

Accordingly, a countermeasure may be considered in which a frequency divider is provided separately on the DC side and on the AC side. However, because the frequency divider is added, the circuit size is likely to be larger, and the circuit cost may be increased.

In this circuit configuration, the signal input to the transistor Q1 is a square wave. Therefore, when transistor Q1 is turned "OFF", etc., a surge voltage is easily generated. Therefore, when the power supply apparatus is applied to the image forming apparatus, an abnormal image may be formed due to interference of the frequency by the surge voltage.

Thus, as illustrated, a method of inserting a snubber circuit may be considered. However, in the snubber circuit, a surge voltage may be generated. When the snubber circuit is inserted, the size of the circuit is likely to increase. Therefore, it is likely to lead to an increase in a circuit cost.

Example of Application to Image Forming Apparatus

The power supply apparatus may be applied to an image forming apparatus as follows.

Figure 25:
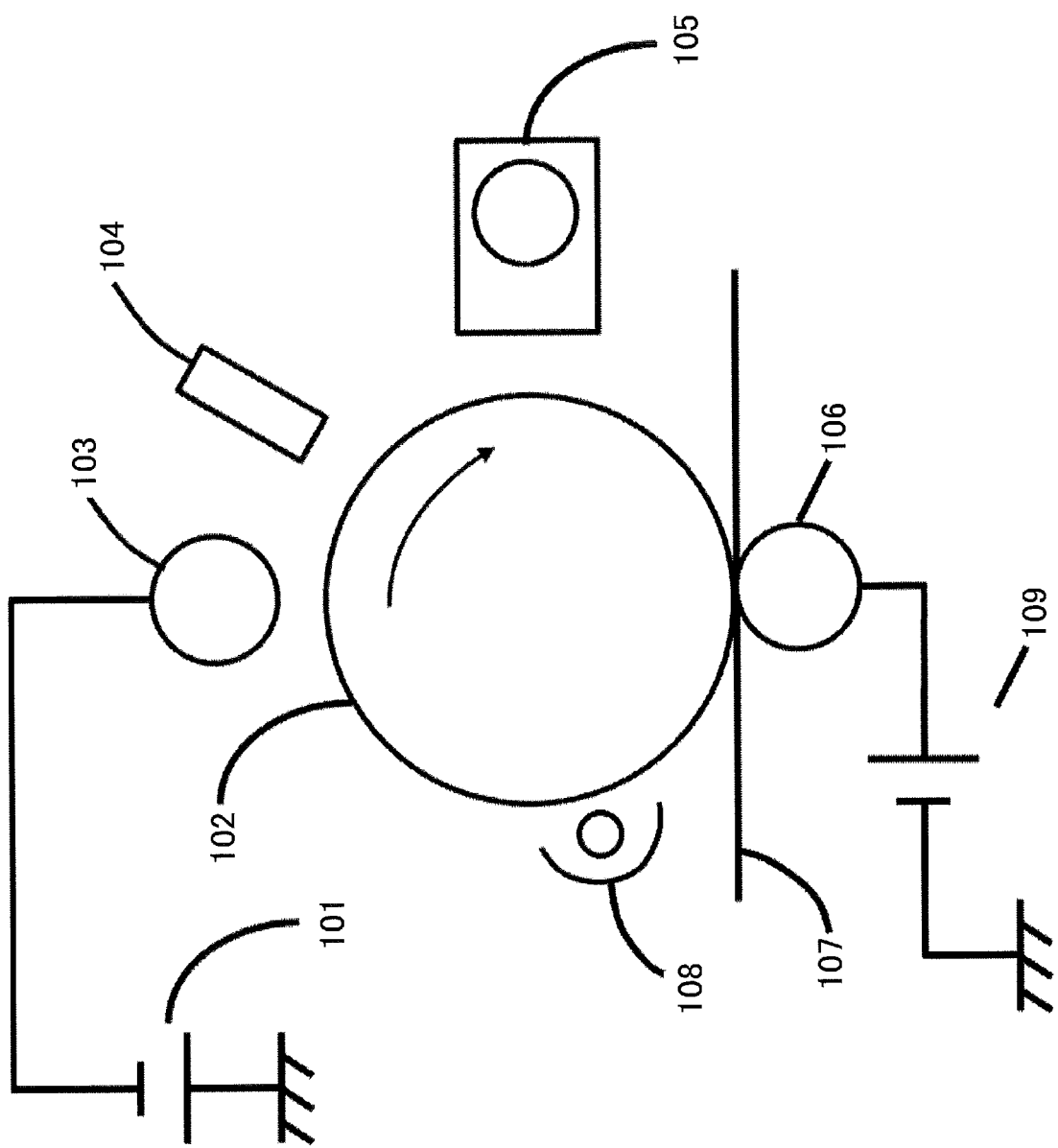
FIG. 25 is a schematic diagram illustrating an example of an image forming apparatus.

FIG. 25 is a schematic diagram illustrating an example of the image forming apparatus.

In the configuration illustrated in FIG. 1, the image forming apparatus 200 applies a high voltage generated by the high voltage power supply 101 to the charging roller 103. Then, the charging roller 103 charges the photosensitive element 102. Thereafter, exposure is provided to the image data by the exposure section 104. Then, an electrostatic latent image is formed on the photosensitive element 102 by exposure.

The toner image is then developed by the developer 105. The toner image developed on the photosensitive element 102 is transferred to the intermediate transfer belt 107 by applying a high voltage generated by the high voltage power supply 109 to the primary transfer roller 106.

Subsequently, the toner image transferred to the intermediate transfer belt 107 is transferred to a recording material, such as a paper, by the secondary transfer unit. Thereafter, the image can be formed on the recording material when the image is fixed by a fixing device.

When there is a neutralizer 108, the neutralizer 108 neutralizes the surface of the photosensitive element 102. When color printing is performed, the same configuration is used for each color. For example, in the case of four colors, there are four similar configurations. The toner image is transferred to the intermediate transfer belt for each color. Subsequently, secondary transfer and fixing are performed.

When the power supply apparatus is applied to the image forming apparatus or the like, an abnormal image is prevented from being formed. Particularly, in the configuration of the image forming apparatus illustrated in the figure, it is desirable to apply to the high voltage power supply 101.

Other Embodiments

Each apparatus may not be a single apparatus. That is, each apparatus may be a combination of apparatuses. Further, the configuration may further include an apparatus other than that illustrated in the figures.

Although an example in the embodiment has been described, the present invention is not limited to the above-described embodiment. That is, various modifications and modifications are possible within the scope of the present invention.

Effects of the Invention

Within embodiments of the present invention, frequency interference can be reduced in output power.

DESCRIPTION OF SYMBOLS

1: AC reference sinusoidal wave generating unit
2: Computing unit
3: Drive period generating unit
4: Modulation wave generating unit
5: Switching
6: Low pass filter
7: DC reference generating unit
8: Computing unit
9: Circuit
10: AC frequency command receiving unit
11: AC voltage command receiving unit
12: DC voltage command receiving unit
13: Synchronous (period) computing unit
14: AC sinusoidal wave generating unit
15: AC output computing unit
16: DC drive sinusoidal wave generating unit
17: DC output computing unit
18: Drive signal converting unit
19: Output voltage receiving (FB) unit
21: Transistor current receiving (FB) unit
22: DC output voltage receiving (FB) unit
32: High-voltage AC generation circuit
33: High-voltage DC generation circuit
34: Transistor
35: Operational amplifier
36: Operational amplifier circuit
45: Multiplier
46: Switch
47: Comparator
100: Power supply apparatus
101: High voltage power supply
102: Photosensitive element
103: Charging roller
104: Exposure part
105: Developer
107: Intermediate transfer belt
108: Neutralizer
109: High voltage power supply
200: Image forming apparatus
300: Current determining section
301: DC bias calculating unit
302: Voltage memory unit
303: Transistor temperature receiving (FB) unit
304: Saturation point memory unit
311: Main clock generating unit
312: counter multiplying factor calculating unit
313: AC drive frequency counter unit
314: AC frequency counter unit
315: DC drive frequency counter unit
BEM: Minimum base-emitter voltage
BS: DC bias
C21: Capacitor
CLK_M: Clock signal
F1: AC drive frequency
F2: AC sinusoidal wave frequency
F3: DC sinusoidal wave frequency GR: Graph
Ib: Base current
Ic: Collector current
IN_1: Frequency command
IN_2: AC output voltage command
IN_3: DC output voltage command
IN_A: frequency command
IN_B: AC voltage command
IN_C: DC voltage command
IN_D: AC output voltage signal
IN_E: DC output voltage
IN_F: Transistor current
IN_T: Temp.
OUT_A: Square wave drive signal
OUT_B: Sinusoidal drive signal
OUT_C: Amplification signal
OUT_D: AC output signal
OUT1: Output
P1: Reset point
P2: Minimum voltage point
PSAT: Saturation point
Q1: Transistor
SAT: Saturation region
SC: Surge generation point
TB: Table
TM1: 1st timing
TM2: 2nd timing
USAT: non-saturated region
Vbe: Base-emitter voltage
W1: Waveform
W2: Waveform

What is claimed is:

1. A power supply apparatus comprising:
a clock signal generating unit that generates a clock signal with a clock frequency;
a calculating unit that calculates a frequency at which a first frequency, a second frequency, and a third frequency are synchronized based on the clock frequency;
an AC voltage output unit that outputs an AC voltage of the second frequency based on a signal of the first frequency;
a DC voltage output unit that outputs a DC voltage based on a signal of the third frequency, the DC voltage output unit including one or more transistors; and
an output unit that outputs power based on the AC voltage and the DC voltage, wherein
a use area of the one or more transistors is controlled to be a non-saturated region equal to or smaller than a saturation point, at which a collector current is saturated in the one or more transistors,
a hardware memory stores saturation points of each of the one or more transistors; and
the power supply apparatus determines whether the collector current is saturated based on the saturation points stored in the hardware memory.

2. The power supply apparatus according to claim 1, wherein the calculating unit calculates
a first counter value that realizes the first frequency based on the clock frequency,
a second counter value that realizes the second frequency by multiplying the first counter value by a first multiplying factor, the realized second frequency being a first integral multiple of the clock frequency, and
a third counter value that realizes the third frequency by multiplying the first counter value by a second multiplying factor, the realized third frequency being a second integral multiple of the clock frequency.

3. The power supply apparatus according to claim 1, wherein
the collector current is acquired from the one or more transistors, and
if a value the collector current is greater than a threshold value of the collector current, an output sinusoidal wave is output to the one or more transistors to limit the base current of the one or more transistors.

4. The power supply apparatus according to claim 1, wherein
the collector current is acquired from the one or more transistors, and
a DC bias is set so that the collector current is reset at a phase of 270 degrees.

5. The power supply apparatus according to claim 1, wherein
a minimum base-emitter voltage generated between a base and an emitter in the one or more transistors is acquired, and
a DC bias based on the minimum base-emitter voltage is set.

6. The power supply apparatus according to claim 1, wherein
a temperature of the one or more transistors is acquired, and
a DC bias is set based on the acquired temperature.

7. An image forming apparatus comprising
the power supply apparatus according to claim 1.

8. A voltage control method performed by a power supply apparatus, the method comprising:
generating, by the power supply apparatus, a clock signal of a clock frequency;
calculating, by the power supply apparatus, a frequency in which a first frequency, a second frequency, and a third frequency are synchronized based on the clock frequency;
outputting, by the power supply apparatus, an AC voltage of the second frequency based on a signal of the first frequency;
outputting, by the power supply apparatus, a DC voltage of the third frequency based on a signal of the third frequency;
outputting, by the power supply apparatus, based on the AC voltage and the DC voltage;
controlling a use area of one or more transistors, included in a DC voltage output unit of the power supply apparatus, to be a non-saturated region equal to or smaller than a saturation point, at which a collector current is saturated in the one or more transistors;
storing saturation points of each of the one or more transistors in a hardware memory of the power supply apparatus; and
determining whether the collector current is saturated based on the saturation points stored in the hardware memory.

9. The voltage control method according to claim 8, wherein the method further comprises
calculating a first counter value that realizes the first frequency based on the clock frequency,
calculating a second counter value that realizes the second frequency by multiplying the first counter value by a first multiplying factor, the realized second frequency being a first integral multiple of the clock frequency, and
calculating a third counter value that realizes the third frequency by multiplying the first counter value by a second multiplying factor, the realized third frequency being a second integral multiple of the clock frequency.

10. The voltage control method according to claim 8, the method further comprises
   acquiring the collector current from the one or more transistors, and
   outputting an output sinusoidal wave to the one or more transistors to limit the base current of the one or more transistors if a value of the collector current is greater than a threshold value of the collector current.

11. The voltage control method according to claim 8, wherein the method further comprises
   acquiring the collector current from the one or more transistors, and
   setting a DC bias so that the collector current is reset at a phase of 270 degrees.

12. The voltage control method according to claim 8, wherein the method further comprises
   acquiring a minimum base-emitter voltage generated between a base and an emitter in the transistor and
   setting a DC bias based on the acquired minimum base-emitter voltage.

13. The voltage control method according to claim 8, wherein the method further comprises
   acquiring a temperature of the one or more transistors, and
   setting a DC bias is set based on the acquired temperature.

14. A power supply apparatus comprising circuitry performing as:
   a clock signal generating means for generating a clock signal of a clock frequency;
   a calculating means for calculating a frequency in which a first frequency, a second frequency, and a third frequency are synchronized based on the clock frequency;
   an AC voltage output means for outputting an AC voltage of the second frequency based on a signal of the first frequency;
   a DC voltage output means for outputting a DC voltage of the third frequency based on a signal of the third frequency the DC voltage output means includes one or more transistors; and
   an output means for outputting based on the AC voltage and the DC voltage, wherein
      a use area of the one or more transistors is controlled to be a non-saturated region equal to or smaller than a saturation point, at which a collector current is saturated in the one or more transistors,
      a hardware memory of the power supply apparatus stores saturation points of each of the one or more transistors; and
      the power supply apparatus determines whether the collector current is saturated based on the saturation points stored in the hardware memory.

15. The power supply apparatus according to claim 14, wherein the calculating means calculates
   a first counter value that realizes the first frequency based on the clock frequency,
   a second counter value that realizes the second frequency by multiplying the first counter value by a first multiplying factor, the realized second frequency being a first integral multiple of the clock frequency, and
   a third counter value that realizes the third frequency by multiplying the first counter value by a second multiplying factor, the realized third frequency being a second integral multiple of the clock frequency.

* * * * *